(12) United States Patent
Wright et al.

(10) Patent No.: US 7,653,663 B1
(45) Date of Patent: Jan. 26, 2010

(54) GUARANTEEING THE AUTHENTICITY OF THE DATA STORED IN THE ARCHIVE STORAGE

(75) Inventors: John H. Wright, Dripping Springs, TX (US); Jack E. Olson, Austin, TX (US)

(73) Assignee: Neon Enterprise Software, Inc., Sugarland, TX (US)

( * ) Notice: Subject to any disclaimer, the term of this patent is extended or adjusted under 35 U.S.C. 154(b) by 332 days.

(21) Appl. No.: 11/501,383

(22) Filed: Aug. 9, 2006

(51) Int. Cl.
*G06F 17/30* (2006.01)

(52) U.S. Cl. ...................................... 707/200; 707/204

(58) Field of Classification Search .................. 707/205, 707/204, 3
See application file for complete search history.

(56) References Cited

U.S. PATENT DOCUMENTS

| | | | |
|---|---|---|---|
| 5,758,067 A | 5/1998 | Makinen et al. | |
| 6,078,933 A | 6/2000 | Szalwinski | |
| 6,240,427 B1 | 5/2001 | Szalwinski et al. | |
| 6,345,239 B1 * | 2/2002 | Bowman-Amuah | ............ 703/6 |
| 6,427,132 B1 * | 7/2002 | Bowman-Amuah | .......... 703/22 |
| 6,611,867 B1 * | 8/2003 | Bowman-Amuah | ......... 709/224 |
| 6,615,244 B1 | 9/2003 | Singhal | |
| 6,691,309 B1 | 2/2004 | Lorie | |
| 6,839,803 B1 | 1/2005 | Loh et al. | |
| 6,879,986 B1 * | 4/2005 | Fisher | ......................... 707/101 |
| 6,903,972 B2 | 6/2005 | Lasser et al. | |
| 7,228,309 B1 * | 6/2007 | Fisher | ......................... 707/102 |
| 7,260,590 B1 * | 8/2007 | Williams | ..................... 707/204 |
| 7,337,199 B2 * | 2/2008 | Fisher | ......................... 707/205 |
| 2002/0174139 A1 * | 11/2002 | Midgley et al. | ............. 707/204 |
| 2003/0074343 A1 * | 4/2003 | Onuki | ............................ 707/1 |
| 2003/0088572 A1 * | 5/2003 | Smith | ......................... 707/100 |
| 2006/0149796 A1 * | 7/2006 | Aalmink | ..................... 707/204 |
| 2007/0220059 A1 * | 9/2007 | Lu et al. | ..................... 707/200 |

* cited by examiner

*Primary Examiner*—Jean M Corrielus
(74) *Attorney, Agent, or Firm*—Robert A. Voigt, Jr.; Winstead P.C.

(57) ABSTRACT

A method, computer program product and system for archiving data from an operational database. Data to be archived from the operational database may be stored either as received or transformed in a manner that allows the transformed archived data to be retrieved bit-for-bit identical to the original input received. Further, the data stored in the archive storage is read-only meaning that the data cannot be updated, deleted or modified. Further, backup copies of each of the storage units, which store the archived data, in the archive storage are created for disaster recovery purposes. Additionally, hash values are computed for each of the storage units in the archive storage which are used to detect unauthorized changes to the data stored in the storage units. In this manner, the authenticity of the data stored in the archive storage may be substantially guaranteed.

63 Claims, 14 Drawing Sheets

GUARANTEEING THE AUTHENTICITY OF THE DATA STORED IN THE ARCHIVE STORAGE

TECHNICAL FIELD

The present invention relates to the field of database archiving, and more particularly to guaranteeing the authenticity of the data stored in the archive storage.

BACKGROUND INFORMATION

Operational data may refer to data collected by organizations in the normal course of business. For example, in the case of an organization collecting commercial data, the operational data may include the identity of the purchaser; an invoice number; a credit card number, if used; and the purchaser's contact information. Operational data may be stored in a database, referred to herein as the "operational database," managed by a database management system, such as IBM™ Information Management System (IMS) or IBM™ DataBase 2 (DB2). An operational database may refer to a database that contains up-to-date, modifiable data. A database management system may refer to software that controls the organization (structure of the data), storage, retrieval, security and integrity of the data in the database.

The data in the operational database is generally the organization's official record of the business event or object described by the data. The structure and meaning of the data may be defined by what is referred to as "meta-data." Meta-data may be stored separately from the data and, in some cases, separately from the database management system. Meta-data for an operational database may or may not exist, may or may not be complete, and may or may not be accurate.

The user may have an application program that is needed to retrieve and provide meaning to the data stored in the operational database. In order for the application program to retrieve and provide meaning to the data stored in the operational database, the application program requires that the data conform to the structure definition (the organization of the data as determined by the database management system). The application program depends on the specific version of the operating system and the database management system in order to operate properly.

Data retention is the act of keeping data for a longer period of time. It may exceed the time it is needed in the operational database for business purposes. Data archiving, on the other hand, refers to moving data from the operational database to a different data store or "archive storage" for better management over longer retention periods.

In recent years, there have been various legislative actions of the United States government, United States' state governments, and several other governments across the world, that require organizations of operational data to retain operational data for many years (e.g., seventy years) as well as to be able to interpret the data correctly and testify as to its authenticity. Severe penalties may accrue to the organization if they cannot produce the data if needed during the retention period for any legitimate reason or if they cannot defend the data as being authentic.

In the past, organizations generally did not archive data stored in an operational database. Instead, organizations would maintain the data in the operational database until the retention requirements were exceeded. That is, once the data was no longer needed to be maintained, the data would be deleted from the operational database. However, now that retention requirements are longer, the amount of information that needs to be maintained is greater, and the importance of preserving the original content and meaning of the data is more important, data cannot be practically maintained in an operational database until the retention period ends.

As a result, software products have been developed to archive the data from the operational database into an archive storage. Typically, these software products store data in application format (same format of the application program as discussed above) without sufficient additional information to satisfy retrieval requests to retrieve data directly from the archive storage. For instance, in order to properly query the requested data, the application environment used to generate the archived data may be required in order to retrieve and provide meaning to the archived data. This also requires copying the data back to the application storage in order to use it. If the application environment is no longer available or no longer recognizes the old form of data, the data in archive storage becomes useless. Therefore, there is a need in the art to be able to store data in the archive in a format that can be read and interpreted correctly without resorting to the original application environment. The application environment includes the application programs, database management system, operating system, and hardware.

Further, these archiving software products typically delete the data in the active operational database that is moved from the active operational database to the archive storage. Often these operational databases are part of an application that must run 24 hours 7 days a week and will have periods of very high activity as measured by several thousand transactions per second. By deleting the data in the active operational database that is moved from the active operational database to the archive storage, the application may not be able to handle or service the transactions in a satisfactorily manner. Therefore, there is a need in the art for archiving software that can perform its tasks without stopping the online activity nor slowing it down to the point it cannot service transactions within the required timeframe. That is, there is a need in the art for achieving minimum disruption of the operating environment when moving data from the operational database to the archive storage.

Another problem with typical software products that have been developed to archive data from operational databases is that they do not properly handle data structure changes that frequently occur in the operational environment. The data stored in the operational database has meta-data associated with it. Meta-data may refer to data that describes the content of the data and the relationship the data has with one another. For example, suppose that a field in a business record stores the zip code. Meta-data associated with that field may describe the length of the field storing the zip code. Operational databases can only support a single version of the data structure at any specific time. When there is a change in the meta-data (referred to herein as a "meta-data break"), such as changing the length of the field, these archive software products would simply overwrite the stored data associated with the previous version of the meta-data with the data associated with the latest version of the meta-data. This may be referred to as "rolling the data forward." For example, after 1985, the zip code was extended to contain an additional four digits. These software products may then append the zip codes stored prior to 1985 with four zeroes in order for the data to be commensurate with the latest version of the meta-data. Hence, by rolling the data forward, the data associated with the previous version of the meta-data is no longer maintained in its original form. Hence, if a user desired to retrieve the archived data over a period of time which included a change in the meta-data, then the user would not be able to retrieve the data in its original form prior to the change to the meta-data. Anytime archived data is modified, such as when meta-data changes, the archived data becomes unreliable and there is chance that information will be lost. Consequently, these software products cannot guarantee authenticity of the stored data as the data is not maintained in its original form. Authenticity of data stored in archive storage can further be eroded if the storage method permits updates by several people and does not provide sufficient recording of update activity. The archive system needs to protect from both authorized and unauthorized changes to data to ensure that years later the data will be identical to what it was at the time of archive. Therefore, there is a need in the art to be able to preserve the original form of data when a meta-data break occurs, and to prevent loss of data authenticity due to unauthorized changes.

Further, there is a need in the art to be able to access, via a query (e.g., SQL query), the archived data in its original form that has been archived over a period of time where data structure changes have occurred as discussed above. That is, there is a need in the art for providing standalone query access against archived data containing multiple variations of the data stored over different time periods.

As a result of the above, there is a need in the art for guaranteeing the authenticity of the data stored in the archive storage.

SUMMARY

The problems outlined above may at least in part be solved in some embodiments by either storing the data to be archived from the operational database in the archive storage as received or by transforming the data to be archived in a manner that allows the transformed archived data to be retrieved bit-for-bit identical to the original input received. Further, the data stored in the archive storage is read-only and cannot be updated, deleted or modified. Further, backup copies of each of the storage units, which store the archived data in the archive storage, are created for disaster recovery purposes. Additionally, hash values are computed for each of the storage units in the archive storage which are used to detect unauthorized changes to the data stored in the storage units. In this manner, the authenticity of the data stored in the archive storage may be substantially guaranteed.

In one embodiment of the present invention, a method for archiving data from an operational database comprises the step of storing data segments from the operational database that match a selection criteria in a temporary file. The method may further comprise spooling contents of the temporary file to a component configured to write contents of the temporary file into an archive storage. The method may further comprise creating a storage unit in the archive storage to archive the spooled contents of the temporary file in the archive storage, where the archive storage has one or more storage units. The method may further comprise storing scoping variables for selected columns of data in a repository. The scoping variables in the repository are used to determine which storage unit within the archive storage is to be accessed by a request.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
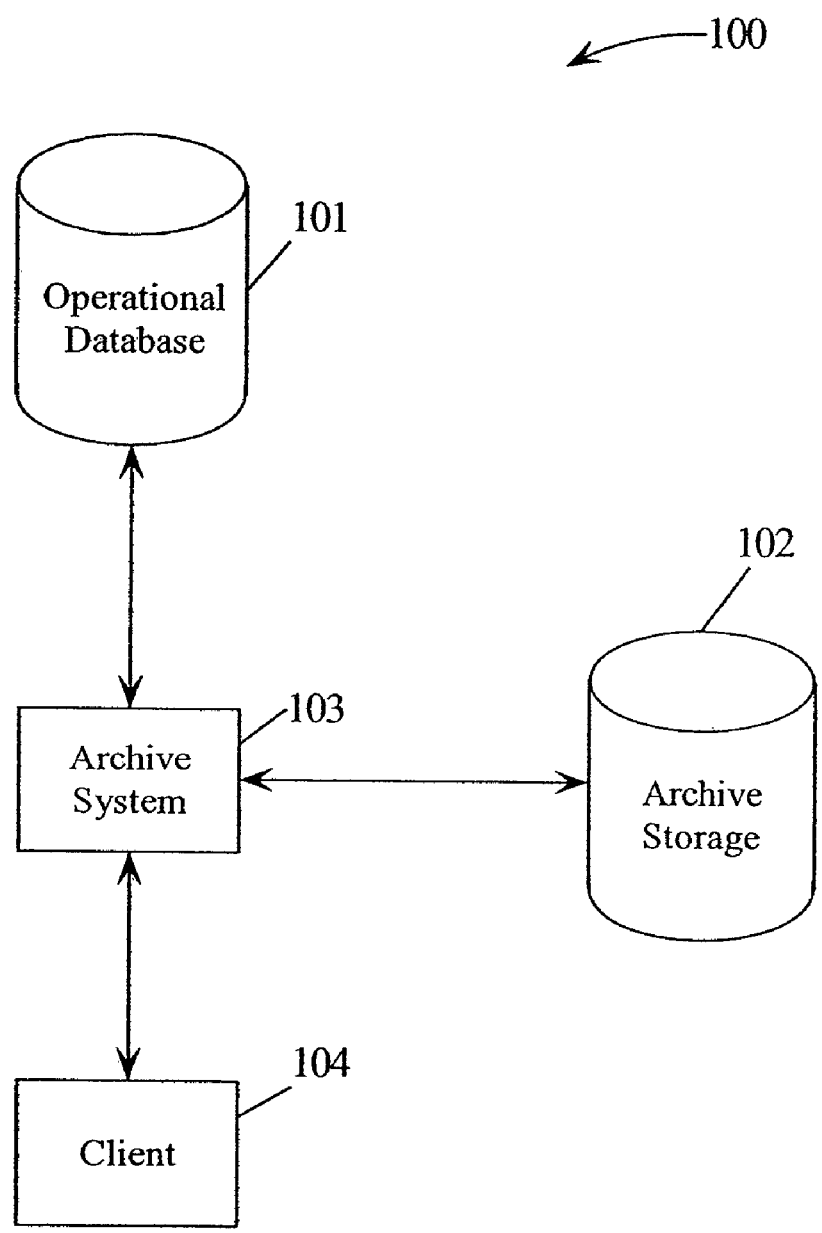
FIG. 1 illustrates a system for storing and accessing archived data in accordance with an embodiment of the present invention.

FIG. 1—System for Storing and Accessing Archived Data

FIG. 1 illustrates an embodiment of the present invention of a system 100 for archiving data from an operational database 101 in an archive storage 102 by an archive system 103. Operational database 101 may refer to a database that contains up-to-date, modifiable data. Operational database 101 may be a hierarchical database (e.g., IBM™ IMS database), a relational database (e.g., IBM™ DB2 database), a database that uses the Virtual Storage Access Method (VSAM) Keyed Sequence DataSet (KSDS) files, or any other database that contains up-to-date, structured, modifiable data. Particular data stored in the operational database may be selected to be archived in archive storage 102 by archive system 103 as discussed further below in connection with FIGS. 2-5. A description of archive system 103 is provided below in connection with FIG. 2. System 100 may further include a client 104 configured to issue requests to archive system 103 to access archive storage 102 as discussed in further detail below in connection with FIGS. 2, 9 and 10. Client 104 may further be configured to receive requested archived data from archive storage 102 via archive system 103 as discussed in further detail below in connection with FIGS. 2, 9 and 10. It is noted that system 100 may include other components that were not depicted for ease of understanding and that FIG. 1 is exemplary. It is further noted that the scope of the present invention is not limited to the components depicted in FIG. 1.

Figure 2:
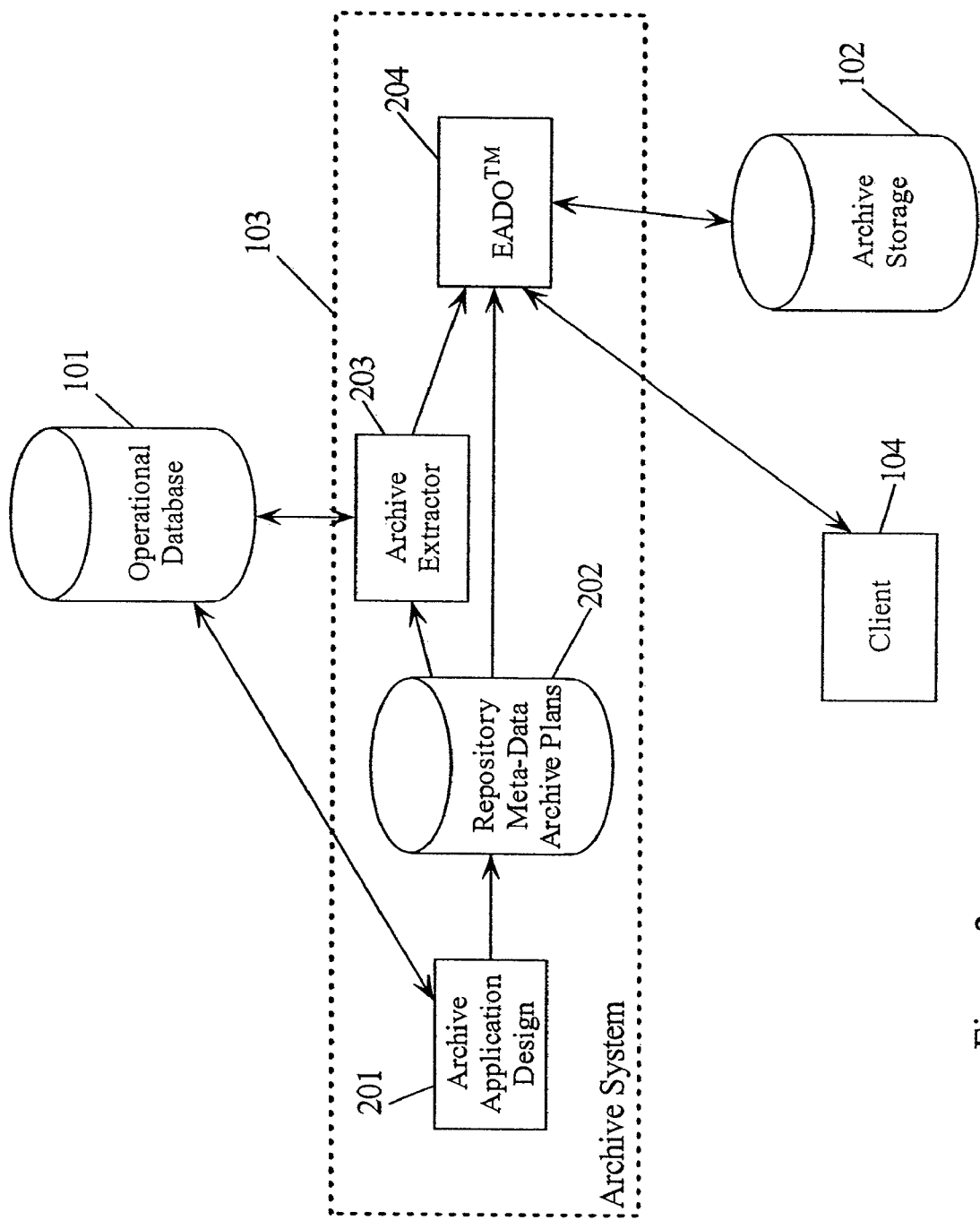
FIG. 2 illustrates an embodiment of the present invention of an archive system.

FIG. 2—Archive System

FIG. 2 illustrates an embodiment of the present invention of an archive system 103 (FIG. 1) configured to archive data from an operational database 101 (FIG. 1). Referring to FIG. 2, archive system 103 may include a software component 201, referred to herein as the "Archive Application Design." Archive application design 201 is used to define: the application data that will be archived from an operational database; the policy for determining when data is ready to be moved to the archive; and the data structure of the moved data when in the archive. All of this information is referred to as the "archive plan" for an operational application. Archive system 103 may further include a repository 202 for storing the plans generated and meta-data (as discussed below) extracted by archive application design 201. Archive system 103 may further include a software component, referred to herein as an "extractor" 203, configured to extract particular data from operational database 101 using policies and meta-data stored in repository 202 by archive application design 201. Archive system 103 may further include a software component, referred to herein as the Encapsulated Archive Data Object (EADO™) 204, configured to accept data from extractor 203 and store it in a unit of storage within archive storage 102. A more detailed description of each of these components of archive system 101 is provided below in connection with FIGS. 3-10.

Figure 4:
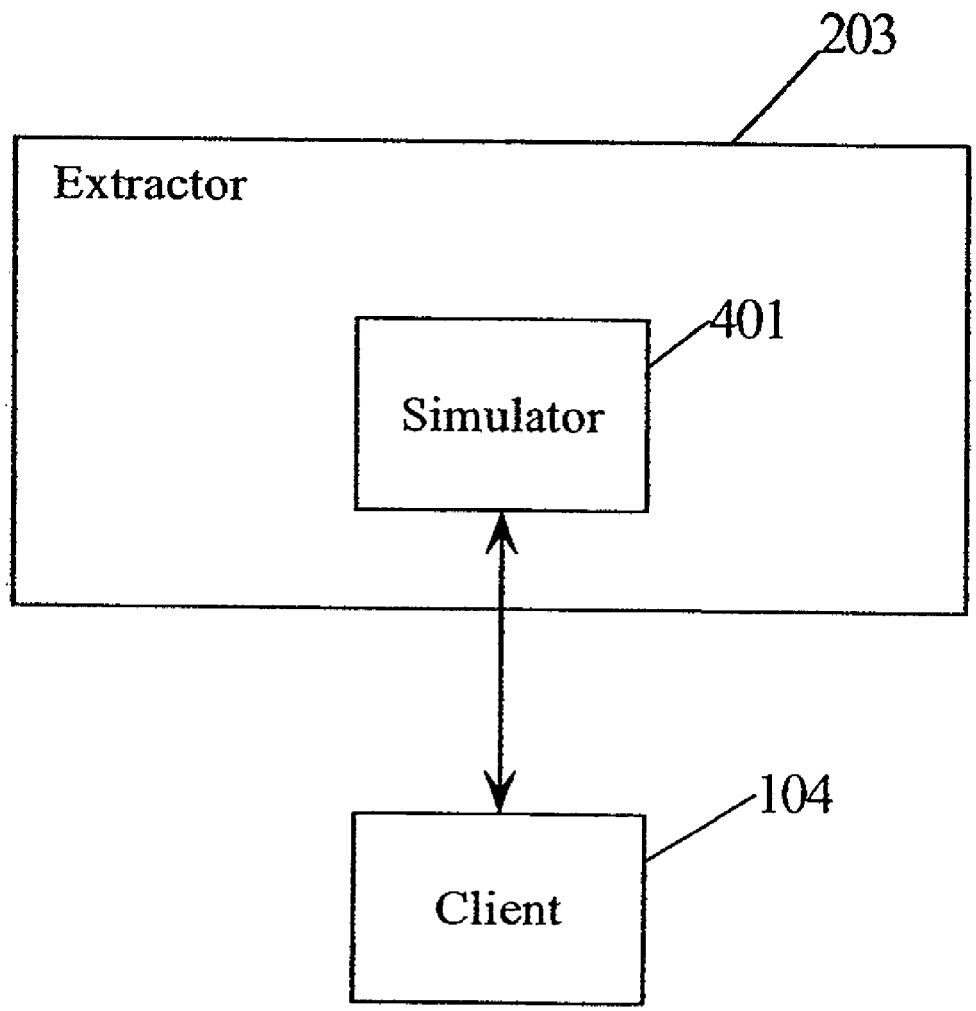
FIG. 4 illustrates a simulator of an extractor in accordance with an embodiment of the present invention.
Figure 5:
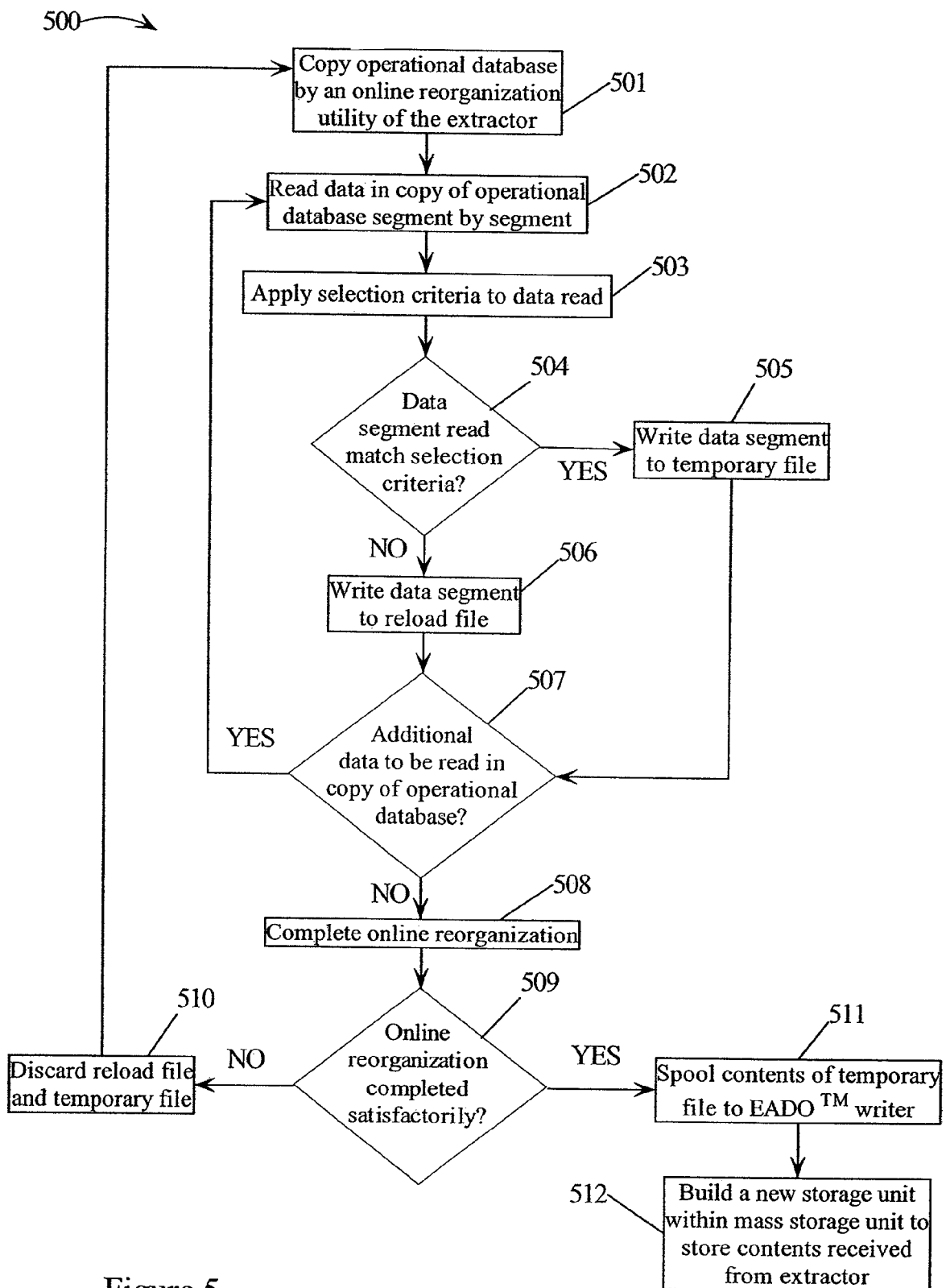
FIG. 5 is a flowchart of a method for extracting data from a hierarchical operational database in accordance with an embodiment of the present invention.
Figure 6:
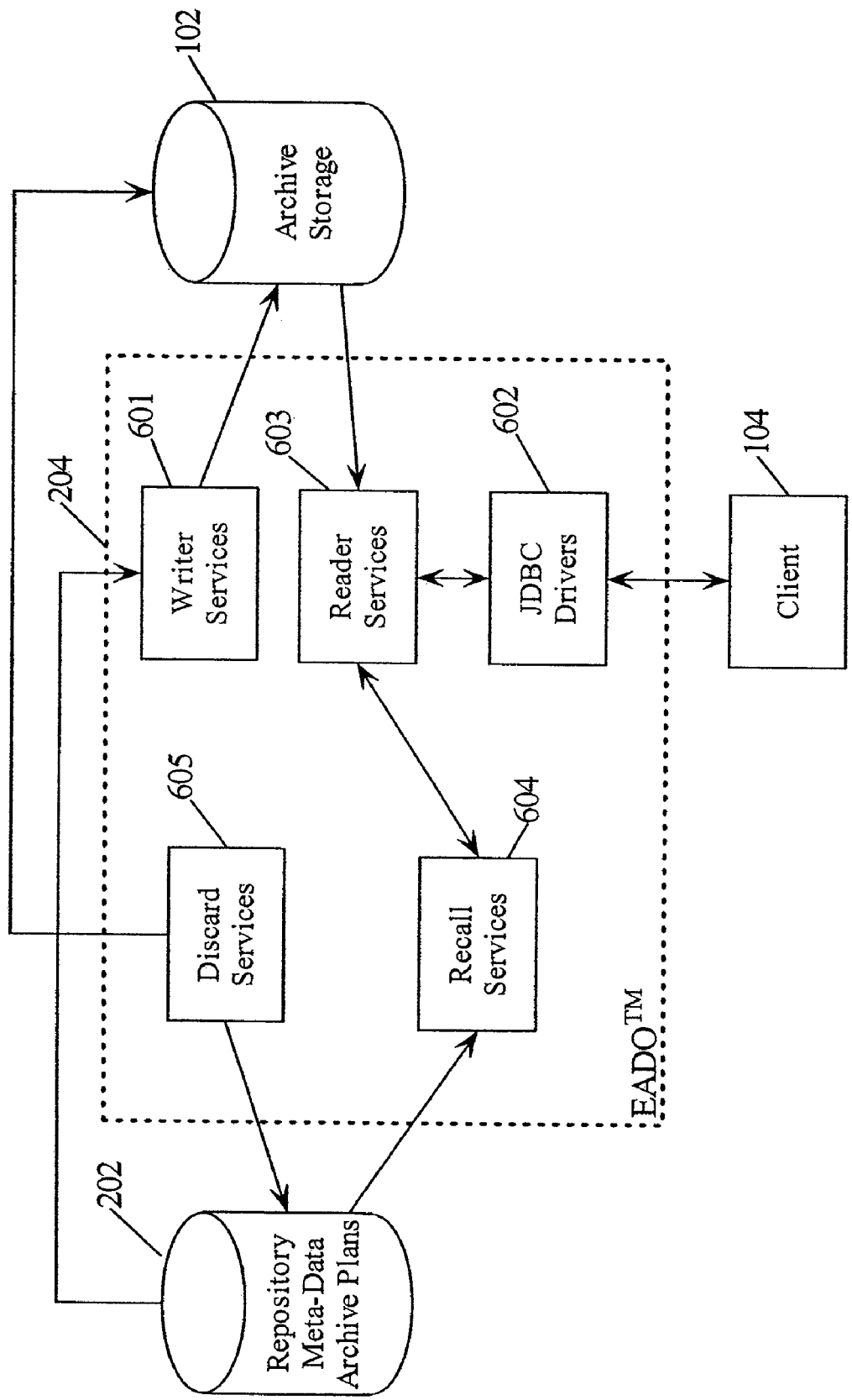
FIG. 6 illustrates the internal software components of EADO™ in accordance with an embodiment of the present invention.
Figure 7:
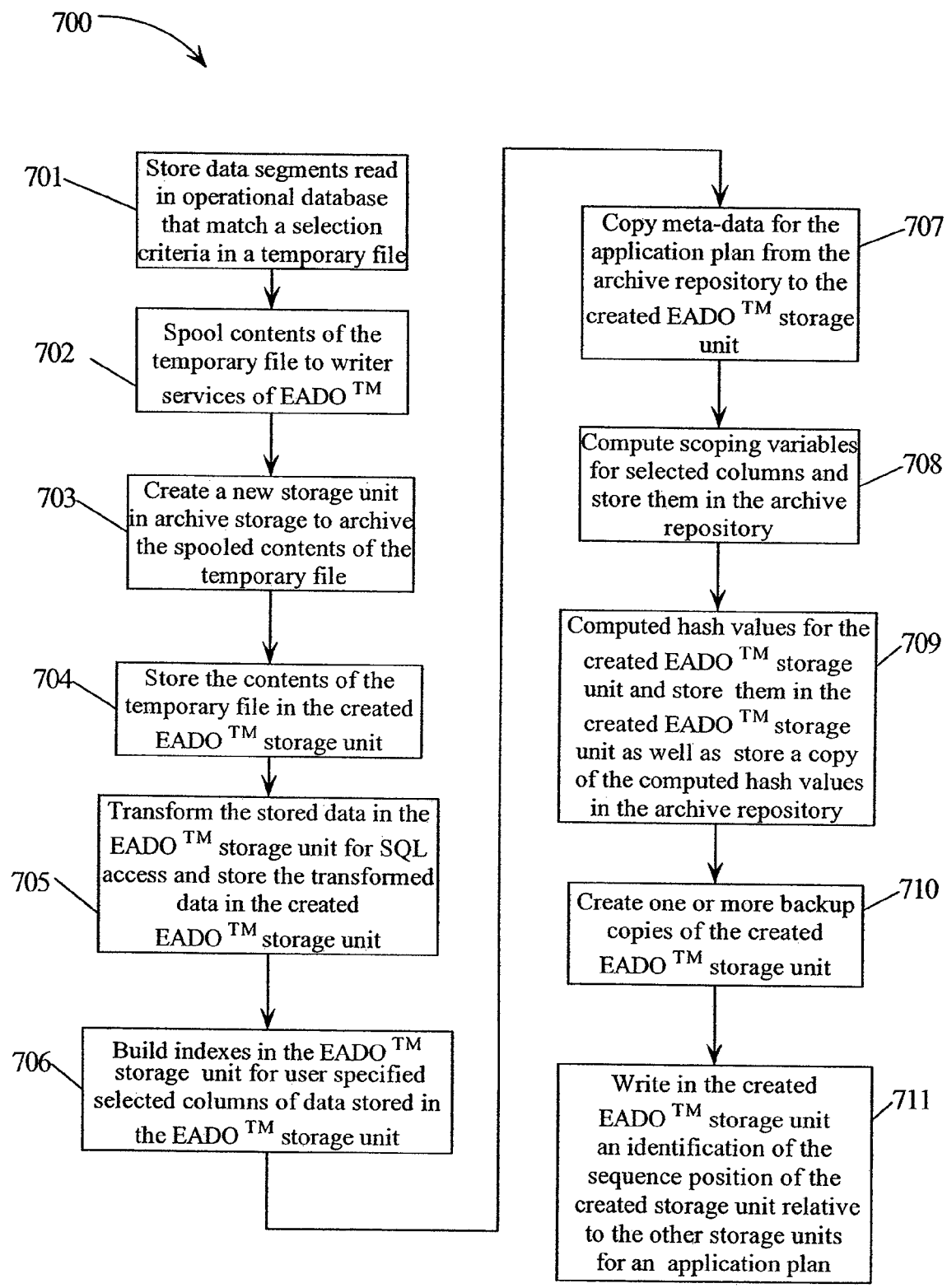
FIG. 7 is a flowchart of a method for storing archived data by EADO™ in accordance with an embodiment of the present invention.
Figure 8A:
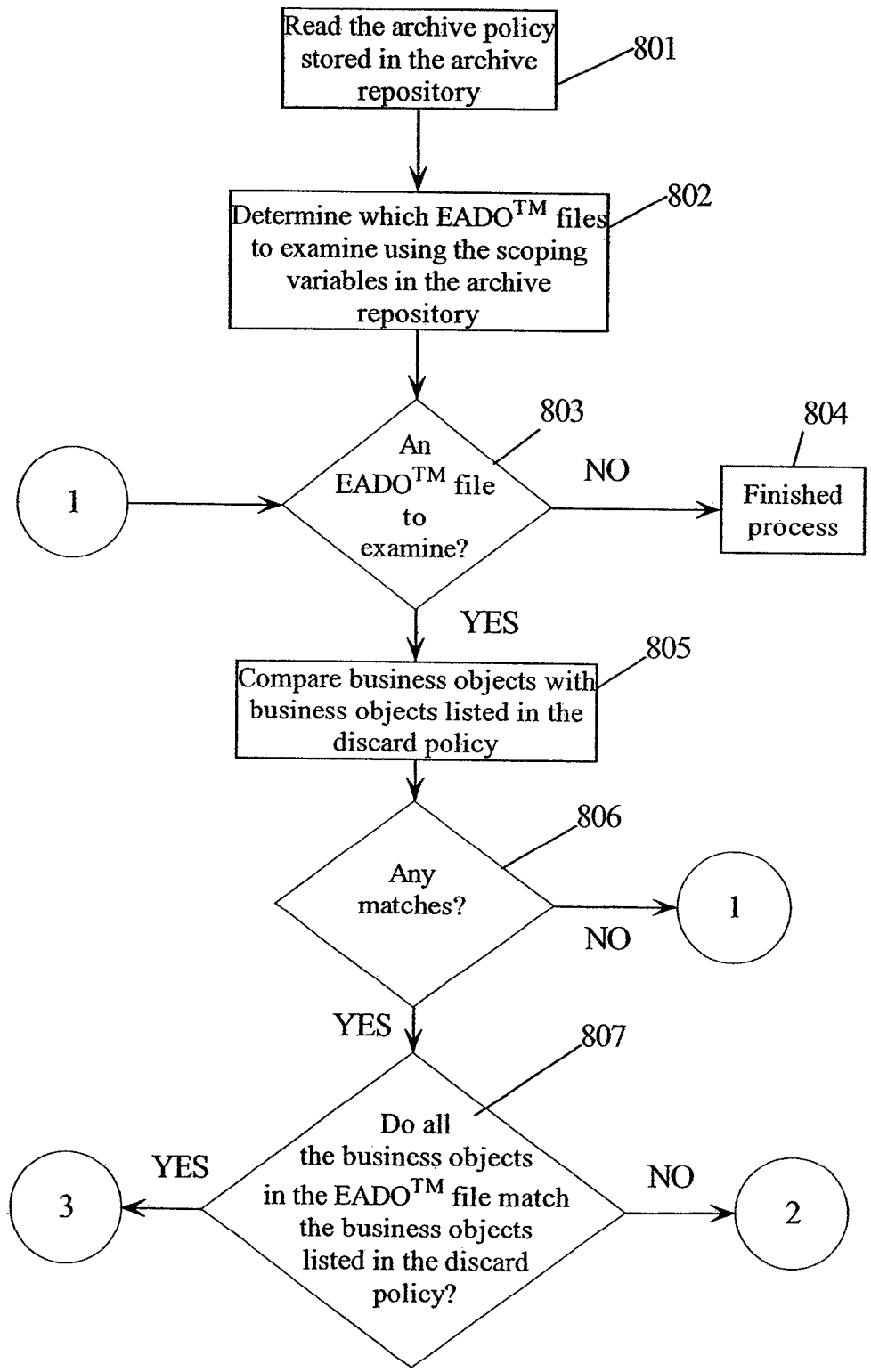
FIG. 8 is a flowchart of a method for discarding records in archive storage that extend beyond the retention period in accordance with an embodiment of the present invention.
Figure 8B:
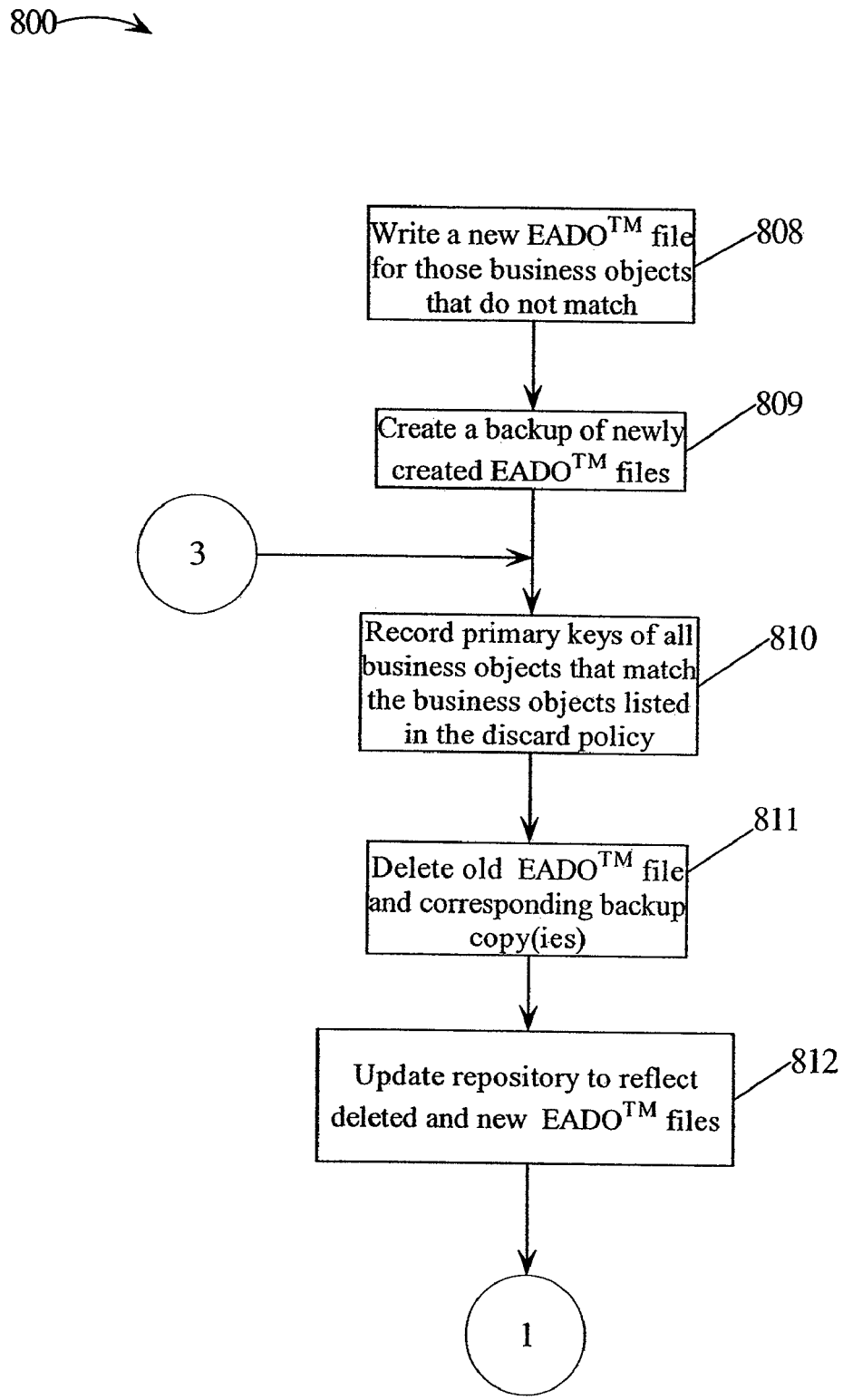
Figure 9A:
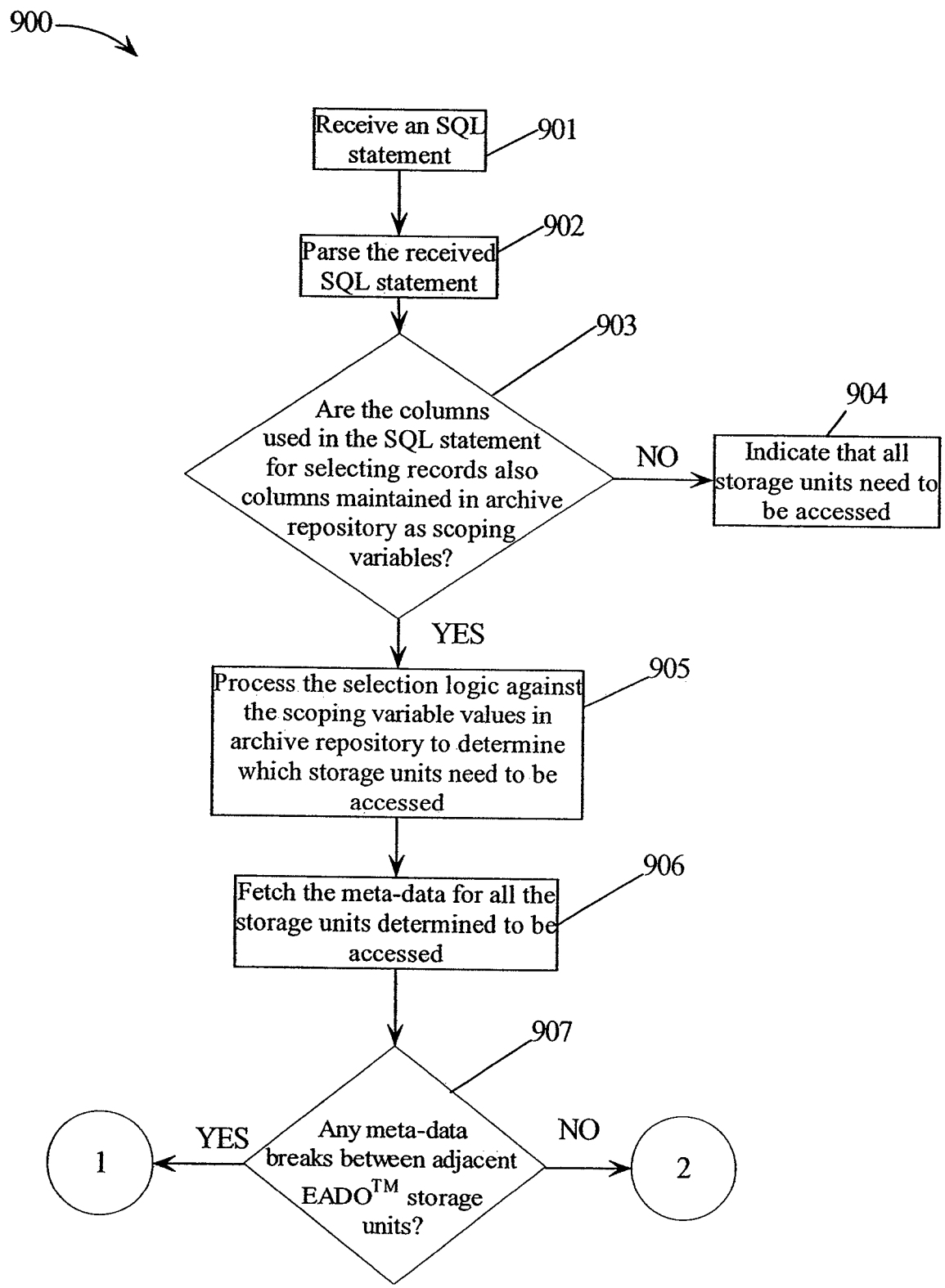
FIG. 9 is a flowchart of a method for accessing data in archive storage that was archived in a transformed state from the operational database in accordance with an embodiment of the present invention.
Figure 9B:
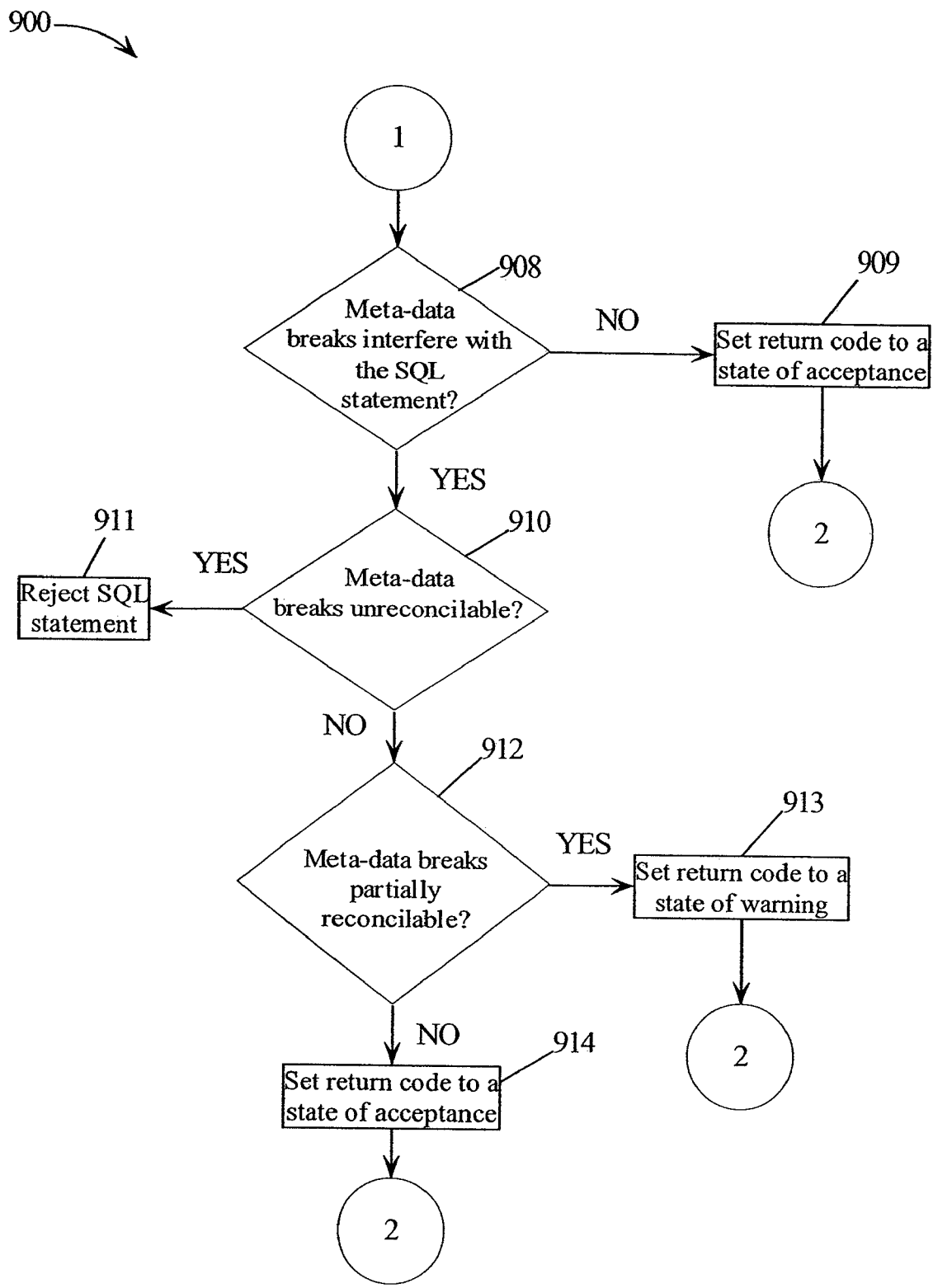
Figure 9C:
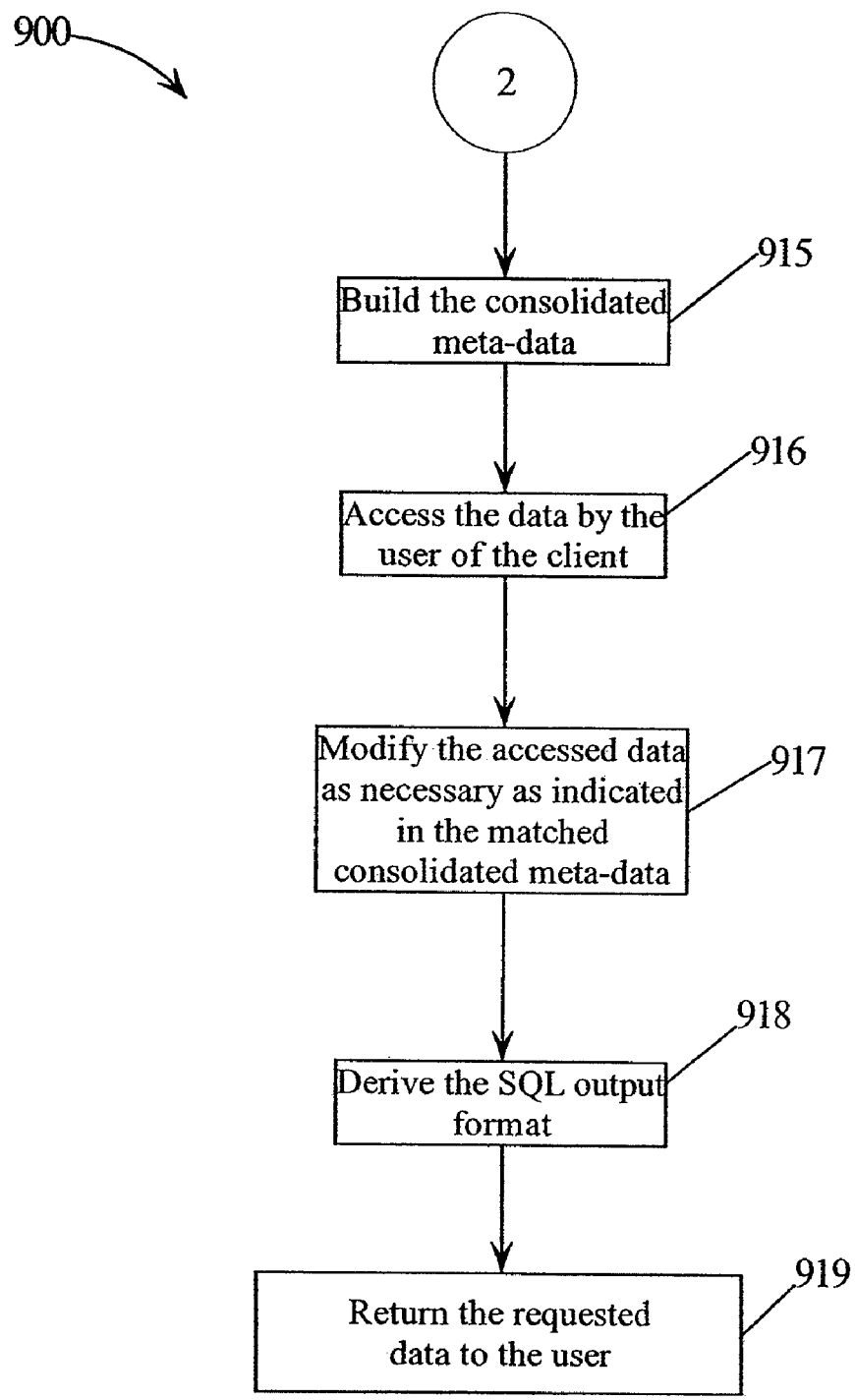
Figure 10:
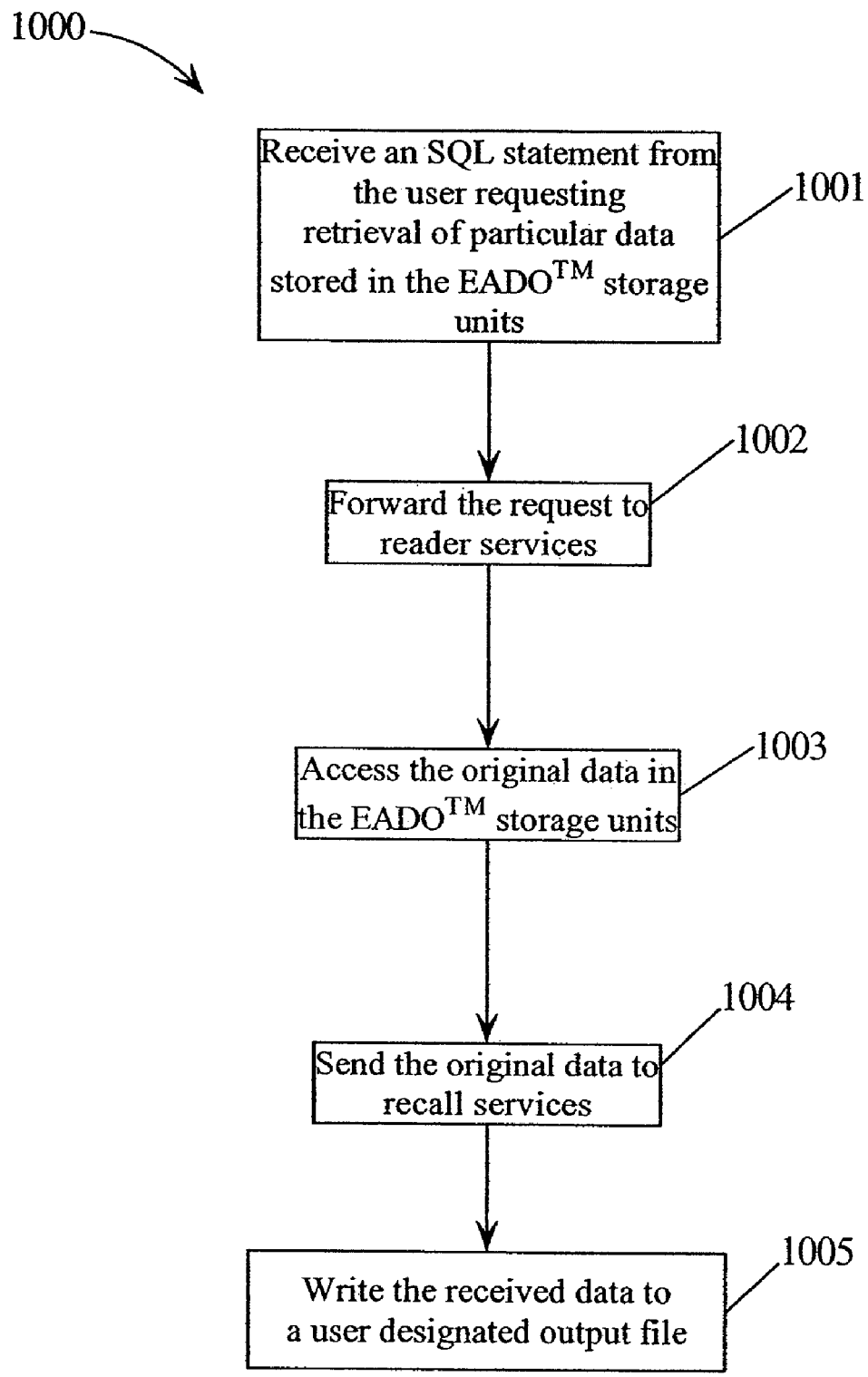
FIG. 10 is a flowchart of a method for accessing data in archive storage that was archived in its original state from the operational database in accordance with an embodiment of the present invention.

In particular, a more detailed description of archive application design 201 defining the plan in archiving particular data from operational database 101 to archive storage 102 is provided below in association with FIG. 3. Further, in particular, a more detailed description of extractor 203 extracting the designated data segments from operational database 101 using the plan defined by archive application design 201 is discussed further below in association with FIGS. 4 and 5. FIG. 4 is a diagram illustrating a simulator software component of extractor 203. FIG. 5 is a flowchart of a method for extracting designated data segments from a hierarchical database. Further, a more detailed description of EADO™ 204 storing the archived data in archive storage 102 is provided further below in association with FIGS. 6 and 7. FIG. 6 is a software architectural diagram of the software component EADO™ 204. FIG. 7 is a flowchart of a method for archiving data in archive storage 102 by EADO™ 204. Further, a more detailed description of the discard services (discussed further below) in EADO™ 204 discarding records in archive storage 102 is provided further below in connection with FIG. 8. FIG. 8 is a flowchart of a method for discarding records in archive storage 102 that exist beyond the retention period. Further, a more detailed description of the writer services (discussed further below) in EADO™ 204 accessing data from archive storage 102 is provided below in connection with FIGS. 9 and 10. FIG. 9 is a flowchart of a method for returning the requested data in archive storage 102 that was transformed when stored in archive storage 102. FIG. 10 is a flowchart of a method for returning the requested data in archive storage 102 that was stored in archive storage 102 in its original format.

Figure 3:
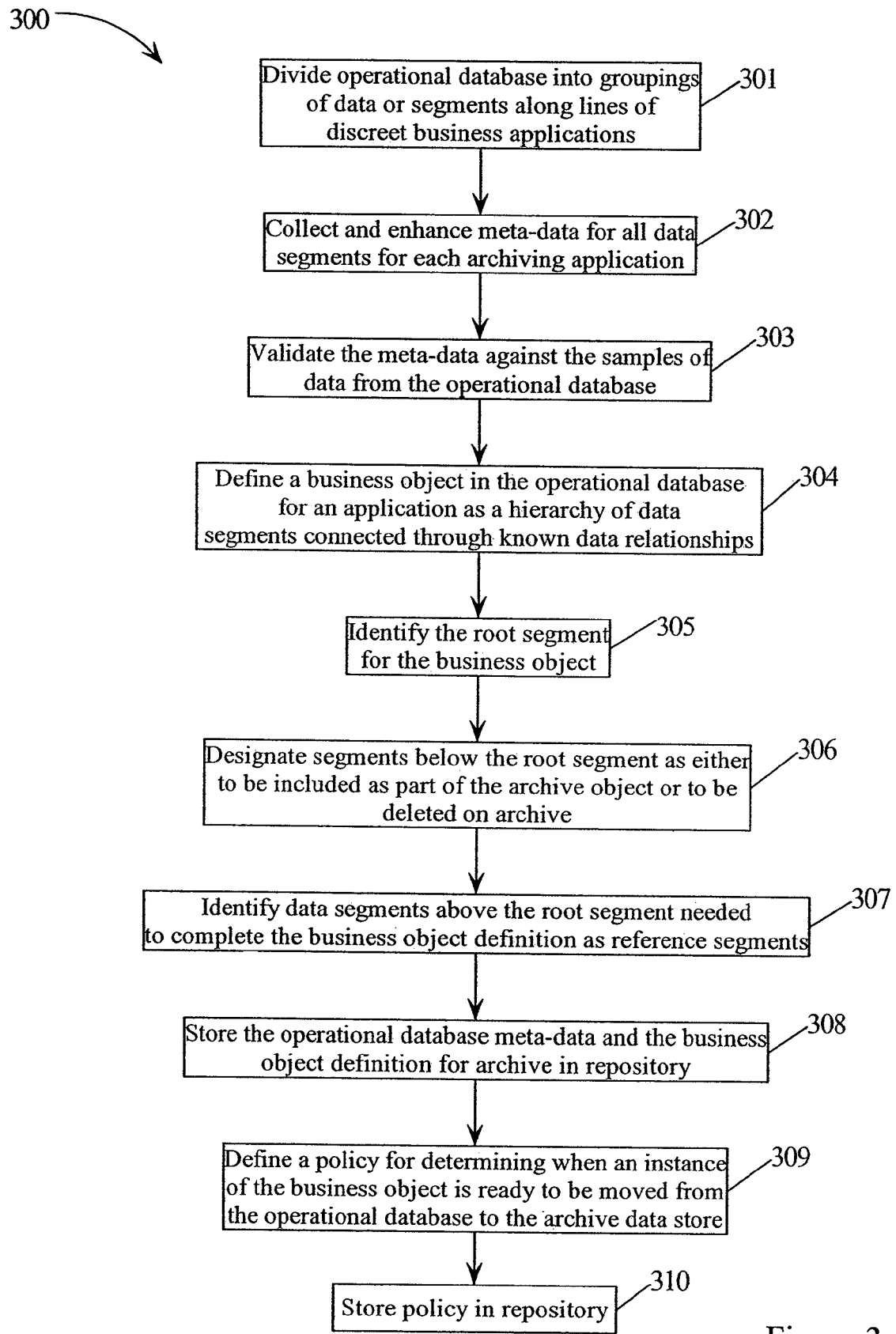
FIG. 3 is a flowchart of a method for defining a plan for archiving data from an operational database in accordance with an embodiment of the present invention.

FIG. 3—Method for Defining a Plan for Archiving Data from an Operational Database FIG. 3 is a flowchart of a method 300 for defining a plan for archiving data from operational database 101 (FIGS. 1-2) to archive storage 102 (FIGS. 1-2) in accordance with an embodiment of the present invention.

Referring to FIG. 3, in conjunction with FIGS. 1-2, archive application design 201 develops a plan to archive data from operational database 101 against logical entities that represent business records and not physical objects, such as records, rows, segments or files. In step 301, archive application design 201 develops such a plan by dividing operational database 101, that stores data for an application, into groupings of data or "segments" along the lines of discreet business applications. Segments are collections of data as defined by operational database 101. For example, if operational database 101 is an IBM™ DB2 database, then a segment is a row of a table. If operational database 101 is an IBM™ IMS database, then a segment, as defined herein, is a segment of the IBM™ IMS database. If operational database 101 is a database that stores data using VSAM for organizing data, then a segment is a data record. In one embodiment, a segment is not subdivided. In one embodiment, when a segment is archived, as discussed further below, the entire segment is moved to be archived.

In step 302, archive application design 201 acquires meta-data for all segments defined for each archiving application. The meta-data can be extracted from operational meta-data objects such as COBOL copybooks (COBOL program data definitions are typically stored in files called COBOL copybooks), Programming Language (PL)/1 data definitions, Information Management System (IMS) Database Descriptor (DBD) control blocks, or DB2 catalog extracts. If none exists, it can be generated manually. In some cases, it can be acquired from other meta-data management repositories.

Meta-data may refer to data that describes the content of data segments and the relationship the data segments have with one another. By extracting meta-data associated with the "segments of interest" (those segments that are to be part of the archive object) from operational database 101, the content of the data segment is known down to the data element level thereby substantially guaranteeing reversible bit-for-bit representation. Knowledge of the individual data elements is used for multiple purposes. For example, it allows the user to specify the selection criteria, as discussed below, that implements the policy for determining which data segment should be moved to be archived in archive storage 102. Further, as discussed further below, it allows EADO™ 204 to reform the data so that it can be accessed through reformat queries from client 104 without having to move the data back to the application environment. That is, a user of client 104 may be able to access and view data in archive storage unit 104 via EADO™ 204 in the requested data's own application environment without the need for EADO™ 204 to generate the requested data's application environment. In this manner, independence from the operational application environment is achieved.

In one embodiment, meta-data includes semantic information not normally found in these sources. The user may enhance the meta-data acquired in order to permit the meta-data to be fully descriptive of the data.

In step 303, the meta-data is verified against samples of data extracted from operational database 101 to ensure correctness. This may be partially a manual process of viewing data and definitions side-by-side and partially an automated process of checking data consistency to typing information.

After identifying operational database 101 groupings of data segments for an application, archive application design 201, in step 304, defines a business object as a hierarchy of data segments connected through known data relationships. Data relationships may be known to operational database 101 explicitly or may only be known to the designer as relationships found by connecting data element pairs across segments. For example, each of the combined data elements may contain a common value, such as an individual social security number. A business object refers to a definition of a business record. Operational database 101 may be used to store data on business activity. The smallest unit of business activity is a business object. For example, a customer account, a deposit transaction, an inventory usage record, a purchase order, and a shipment are all examples of business objects. Each business object may contain multiple segments of information, all of which relate to the single business unit being described.

In step 305, archive application design 201 identifies a root segment for the business object that is to be treated independently in the archive. The root contains a unique data element whose value uniquely identifies the business object. The root segment for a business object of an archive application may or may not be a root segment within operational database 101. The root segment for a business object of an archive application is not the root segment within operational database 101 if the archive designer determines that operational database 101 is a hierarchy of business objects which should be archived independently. For example, a bank account hierarchy may consist of a root segment for an account header with dependent segments for deposit and withdrawal transactions. The archive designer may choose to archive transactions separately for account headers. There would then be two business objects: one business object for transactions with the root segment being the transaction segment and the other business object is for the account with the root segment being at the account level.

In step 306, archive application design 201 designates the segments below the root segment as either to be included as part of the archive business object or to be deleted when the business object is archived. That is, archive application design 201 designates the segments below the root segment as being archived or deleted during the archiving process. Those designated as being archived are archived in archive storage 102; whereas, those designated as being deleted on archive are not archived in archive storage 102. In one embodiment, multiple archiving objects in the same hierarchy follow the rule of not including archive object roots that appear below the root of another archiving object in the higher level archived object. The higher level object will not be archived if segments exist in operational database 101 for a lower level root.

In step 307, the archive designer designates segments outside of the hierarchy of segments below the business object root level that need to be included for information completeness. For example, when archiving banking deposits and withdrawals as business objects, information that identifies the account holder may be required. This would be taken from the account header segment. These segments are referred to as "reference segments" in archive storage 102 since they are not deleted from operational database 101.

In step 308, archive application design 201 stores the meta-data for operational database segments and the business object definitions for an archive application in archive design repository 202.

Once the archive business object has been defined, in step 309, archive application design 201 defines the policy for determining when an instance of the business object is ready to be moved from operational database 101 to archive data store 102. That is, once the archive business object has been defined, archive application design 201 defines the selection criteria (from part of the plan) with which to select the data segments ("segments of interest") in operational database 101 to be archived. Segments of interest may refer to the root segment, segments directly above the root segment, and those segments below the root segments that are to be part of the archive object. The policy plus the business object definitions form the "plan" for an application. This is stored in archive design repository 202 in step 310. The selection criteria of the policy is defined in terms of a predicate (a statement that evaluates an expression and provides a true and false answer based on the condition of the data) expression on the data fields of the segments of interest. Further, the policy includes the validated meta-data to identify which data segments are to be extracted from operational database 101.

It is noted that method 300 may include other and/or additional steps that, for clarity, are not depicted. It is further noted that method 300 may be executed in a different order presented and that the order presented in the discussion of FIG. 3 is illustrative. It is further noted that certain steps in method 300 may be executed in a substantially simultaneous manner or may be omitted.

As stated above, extractor 203 is configured to extract designated data segments from operational database 101 using the plan stored in repository 202 that was developed by archive application design 201. Extractor 203 is also configured to simulate extraction without actually extracting data from operational database 101. In one embodiment, extractor 203 includes a simulator as illustrated in FIG. 4 as discussed below. Further, an embodiment of extractor 203 extracting designated data segments from a hierarchical operational database 101 is discussed further below in connection with FIG. 5.

FIG. 4—Simulator Component of Extractor

FIG. 4 illustrates a component, referred to herein as the "simulator" 401, of extractor 203 in accordance with an embodiment of the present invention. Simulator 401 is configured to simulate the process of archiving without removing data from operational database 101. Simulator 401, which may be a software component, contains the functionality of executing the functions of extractor 203, as discussed below in association with FIG. 5, without actually deleting data from operational database 101. In one embodiment, the user of client 104 may access extractor 203 to instruct simulator 401 to simulate extracting data from operational database 101 using the plan stored in repository 202 without actually deleting data from operational database 101. Simulator 401 builds and stores data in archive data store 102 and marks it as simulation data. The user can test it by using the same access tasks as available to all data in archive 102. The simulation data is deleted from archive data store 102 when it is no longer needed.

Simulator 401 may further be configured to assess resource impacts that will be required when archiving is put into operation. For example, simulator 401 may be able to assess the amount of machine processing time, space requirements on archive storage 102 and the potential impacts on operational system performance (the archive system preferably runs on a computer system as discussed further below in conjunction with FIG. 11) when archiving is put into operation. It is noted that extractor 203 may include other software components to execute the steps of method 500 as discussed below that were not illustrated for ease of understanding. It is further noted for clarity that extractor 203 executes, e.g., through code, the steps of method 500 as discussed below.

FIG. 5—Method for Extracting Data from Hierarchical Operational Database

FIG. 5 is a flowchart of a method 500 for extracting data from hierarchical operational database 101 (e.g., IBM™ IMS database) in accordance with an embodiment of the present invention.

Referring to FIG. 5, in conjunction with FIGS. 1-2, in step 501, extractor 203 copies operational database 101 by an online reorganization utility within extractor 203. The online reorganization utility may refer to software code within extractor 203 configured to reorganize the data stored in operational database 101 after a portion of its contents are deleted. A more detailed description of such an online reorganization utility is described in U.S. patent application Ser. No. 10/923,375, filed on Aug. 20, 2004, entitled "Facilitating Suspension of Batch Application Program Access to Shared IMS Resources," which is incorporated herein by reference in its entirety. By making a copy of operational database 101, extractor 203 allows updates to be made to the data on the active operational database 101 while the archiving process is running.

In step 502, extractor 203 reads the data in the copy of operational database 101 segment by segment. Since extractor 203 is reading a copy, there is no concern about an interference with online update activity.

In step 503, extractor 203 applies the selection criteria defined in the policy section of the archive plan stored in repository 202 to the data read in the copy of operational database 101. It is noted for clarity that extractor 203 applies the selection criteria defined in a specific archive plan that is used to define the data to be extracted from this particular copy of operational database 101.

In step 504, for each root data segment read by extractor 203, extractor 203 determines whether the business object for that root segment read in the copy of operational database 101 matches the selection criteria.

If the data read by extractor 203 matches the selection criteria, then, in step 505, extractor 203 writes all data segments for the business object to a temporary file. In one embodiment, the temporary file resides in a storage unit (1120 of FIG. 11) on a system operating extractor 203.

If, however, the data read by extractor 203 does not match the selection criteria, then, in step 506, extractor 203 writes the data segments to a file referred to herein as the "reload file." The reload file is used by the online reorganization utility of extractor 203 to reorganize the data stored in operational database 101. In one embodiment, the reload file resides in a storage unit (1120 of FIG. 11) on a system operating extractor 203.

Upon writing the data segments to either the temporary file or the reload file, in step 507, extractor 203 determines whether there is additional data to read in the copy of operational database 101.

If there is additional data to be read in the copy of operational database 101, then, in step 502, extractor 203 reads the next root data segment in the copy of operational database 101.

If, however, there is no more additional data to be read in the copy of operational database 101, then, in step 508, extractor 203 completes the online reorganization. The online reorganization utility completes the online reorganization (reorganizing data in active operational database 101) using the reload file. The reload file contains those segments that were not identified as matching the selected criteria and hence are those segments that are to remain in operational database 101. By using the reload file, the online reorganization utility effectively deletes the archived segments from the active operational database 101. Further, the online reorganization utility writes a log showing all deletes that were made using the archive temporary file. Reorganization applies all updates to operational database 101 saved during the archiving process to the reloaded database.

In step 509, extractor 203 determines whether the online reorganization was completed satisfactorily. If the online reorganization was not completed satisfactorily, then, in step 510, the reload and the temporary files are discarded. Upon discarding the reload and the temporary files, method 500 is repeated starting with executing step 501.

If, however, the online reorganization was completed satisfactorily, then, in step 511, extractor 203 spools the contents of the temporary file to the writer in EADO™ 204.

In step 512, EADO™ 204 builds a new storage unit within archive storage 102 to store the contents received from extractor 203.

Once operational database 101 has been reorganized and all updates applied, the archive is considered "committed." If any interruptions occur prior to this point, then the process of method 500 is repeated.

If an interruption occurs after the archive is considered committed during the process of spooling the temporary file to EADO™ 204, then the spooling process is repeated until completed. There is no need to synchronize writes at a checkpoint since EADO™ 204 will merely discard any data written prior to the interruption.

It is noted that method 500 may include other and/or additional steps that, for clarity, are not depicted. It is further noted that method 500 may be executed in a different order presented and that the order presented in the discussion of FIG. 5 is illustrative. It is further noted that certain steps in method 500 may be executed in a substantially simultaneous manner or may be omitted.

As stated above, EADO™ 204 is configured to accept data from extractor 203 and store it in a unit of storage within archive storage 102. A more detailed description of the internal software components of EADO™ 204 is described below in association with FIG. 6.

FIG. 6—Architecture of EADO™

FIG. 6 illustrates the internal components of EADO™ 204 (FIGS. 1-2) in accordance with an embodiment of the present invention. Referring to FIG. 6, in conjunction with FIGS. 1-5, EADO™ 204 may include software components such as a component referred to as the "writer services" 601. Writer services 601 is configured to receive those contents spooled from a temporary file by extractor 203 as discussed above in association with FIG. 5. The spooled data represents the output of a single execution of the archive extractor 203 component. Upon receiving the spooled contents, writer services 601 creates a new storage unit within archive storage 102 to store these spooled contents. In one embodiment, every time writer services 601 receives some new spooled contents, writer services 601 creates a new storage unit within archive storage 102 to store those spooled contents. Further, in one embodiment, each storage unit within archive storage 102 is one or more operating system files. Upon creating the new storage unit within archive storage 102 to store the spooled contents, writer services 601 writes the received contents to that storage unit in archive storage 102.

EADO™ writer services 601 creates a storage unit in archive storage 102 that encapsulates all data and other information needed to satisfy all future requests and also formats the data for efficient access. In one embodiment, EADO™ writer services 601 stores the data as received from the spooler bit-for-bit as well as transforms the data and stores it a second time (the transformed data) for efficient access via an industry standard Java DatabBase Connectivity (JDBC) Structured Query Language (SQL) request. Further, EADO™ writer services 601 may build and store indexes over user-designated columns of data stored in the EADO™ storage unit for efficient access as well as to store meta-data in the EADO™ storage units. In one embodiment, the data components of the EADO™ storage unit may be encrypted as requested by the user.

Meta-data stored in EADO™ storage unit is a copy of the meta-data stored in repository 202 and represents the true meta-data for the plan application of the data extracted. The meta-data for two successive EADO™ storage units may be identical or may be different depending on whether meta-data changes have occurred between extract executions.

EADO™ writer services 601 may also compute values for scoping variables for columns of data in the EADO™ storage unit designated by the user. This designation is included in the application plan. Scoping variables are values representing the range of values for a column of data or a discrete list of values found in the column of data. Scoping variables are used during access to limit the number of storage units that have to be read to satisfy the request. EADO™ writer services 601 stores the scoping variables in archive repository 202 so that decisions on which of the EADO™ storage units to access is determined without having to read any of them.

EADO™ writer services 601 may further compute a hash value over the entire storage unit and store it in the storage unit as well as in archive repository 202. This is used in EADO™ maintenance to determine if the EADO™ storage unit has been corrupted. Further, EADO™ writer services 601 may be configured to create multiple backup copies of each storage unit within archive storage 102 as requested by the user.

As stated above, writer services 601 writes the received contents to a newly built storage unit in archive storage 102. Each storage unit in archive storage 102 may contain an identification of a sequence position relative to the other storage units in archive storage 102 for an archiving plan. That is, each storage unit within archive storage 102 for an archiving plan may contain information that identifies the position of that particular storage unit with respect to the other storage units within archive storage 102. The identification of the sequence position may be stored in the storage unit. Further, the storage unit may be registered in archive repository 202. Registration in this context refers to the recording of the storage unit in archive repository 202 showing its sequence number, storage address, storage addresses of backup copies and scoping variables.

EADO™ 204 may further include a JDBC driver 602, which is an API for the Java™ programming language that defines how client 104 may access archive storage 102 using the SQL query language. Typically, the user of client 104 issues a request to EADO™ 204 that is received by JDBC driver 602 via an interface (not shown). The request is in the form of a Structured Query Language (SQL) statement.

JDBC driver 602 forwards the request to a component, referred to herein as the "reader services" 603, to determine which storage units in archive storage 102 are accessible by the request, by reviewing the meta-data and scoping variables in archive repository 202 for the application plan. The meta-data and the scoping variables may be used by reader services 603 to determine which storage units within archive storage 102 are to be accessed by the request. In one embodiment, if the request from the user of client 104 is an SQL statement and if a predicate of the SQL statement contains column names for which scoping variables have been saved, then reader services 603 may examine the scoping variables in archive repository 202 to determine which storage units in archive storage 102 need to be accessed. In this manner, a standalone query to access the data in archive storage 102 may be provided.

Once reader services 603 determines which storage units within archive storage 102 are to be accessed by the request, reader services 603 reads the requested data from the identified storage units within archive storage 102. In one embodiment, archive storage 102 is read-only and hence reader services 603 can only read and not modify or update the data stored in archive storage 102. In one embodiment, reader services 603 reads the requested data via an interface (not shown) in EADO™ 204. Upon reading the requested data, reader services 603 formats the data read per the request as standard SQL output. Reader services 603 sends the formatted data to JDBC driver 602 which in turns sends the requested data to the user of client 104.

Reader services 603 may further be configured to read the meta-data in archive repository 202 for the storage units designated to be used to determine if there are any "meta-data breaks." Meta-data breaks refer to changes in the meta-data between the successive storage units in archive storage 102. For example, suppose that before 1985, a particular field in a business record stored the Zone Improvement Plan ("zip") code which consisted of five digits at that time. After 1985, the zip code was extended to contain an additional four digits to allow a piece of mail to be even more accurately directed to a very small geography. Hence, the same field in the business record after 1985 may have been modified to store a nine digit number. Hence, the meta-data that described the content of the field prior to 1985 may have indicated that the length of the field is five digits; whereas, the meta-data that described the content of the same field after 1985 may indicate that the length of the field is nine digits. Hence, there is a difference in the meta-data before and after 1985. This may be referred to as a meta-data break. A meta-data break may be identified when the user of client 104 requests data over a period of time that involves a meta-data break. For example, suppose that the user of client 104 requested data from 1983-1990 and during that time the field length of the field described above was expanded to nine digits from five digits in 1985. Reader services 603, upon reading the meta-data in archive repository 202 for the storage units designated to be used, would identify such a meta-data break occurring in 1985.

Meta-data changes causing meta-data breaks may be classified into three categories: "cosmetic," "minor structural," and "major structural." Cosmetic meta-data changes may refer to changes that do not affect the basic structure of the business object. For example, changing the length of a data element or changing the data type while staying within a data type group that allows data to be transformed between data types without data loss or reordering data elements within a data segment may be classified as cosmetic meta-data changes. These changes alter the structure of data stored but are fully reconcilable when accessing data before and after the break.

Minor structural changes may refer to data changes in the data segments before and after the break; however, the basic structural integrity is maintained. Examples of minor structural changes include: adding a new data element to a data segment; deleting a data element from a data segment that is not part of a primary key (e.g., account number) which is one or more fields (columns) in a database table that uniquely identifies the row; changing the semantics of a column that is not a key; adding a new data segment to the bottom of the business object hierarchy; and deleting a data segment from the bottom of the business object hierarchy.

Major structural changes may refer to those changes that alter the basic structure of the data in a way that is not reconcilable. Examples of major structural changes include changing the definition of a primary or foreign key or deleting or adding segments above the bottom of the hierarchy. In these cases, the data stored before the break cannot be viewed through the same relational view as data stored after the break. They are essentially different archive plans. Typically, major structural changes would result in one archive plan being ended and a new archive plan being started.

Meta-data breaks may exist between EADO™ events that create new storage units for an archive plan. Meta-data breaks do not need to be defined for each change prior to being archived. For example, if a corporation changes an application fifteen times during a quarter but only archives once a quarter, then all the changes may be rolled up into one meta-data break.

An additional way of reading data from an EADO™ storage unit is through a component called recall services 604. Recall services 604 uses reader services 603 to access the storage units in archive storage 102. A request to recall services 604 is a request to selectively move data segments from an EADO™ storage unit into an operating file in a format that is identical to the data spooled into reader services 603 when the storage unit was created. This guarantees that the user can extract the data bit-for-bit as it was originally received.

As stated above, archive storage 102 is read-only. However, records from storage units in archive storage 102 may be deleted by a component, referred to herein as "discard services" 605, if the records exist beyond a retention period and also satisfy the user provided policy for discarding. For example, if the archive policy states that particular records are only to be archived until a designated date and that date has transpired, then discard services 605 may delete those records. In one embodiment, the discard records are overwritten in archive storage 102 with binary zeroes. The identifier (primary key) of each record deleted is logged in archive repository 202. If all of the records in a storage unit were deleted, then the storage unit is deleted from such storage and the unit in archive repository 202 is marked by discard services 605 as having no data. Further, the hash value for the storage unit is recomputed and stored. All backup copies are recopied to reflect the storage unit with deleted data.

As stated above, EADO™ 204 is configured to store the spooled contents of the temporary file into a storage unit within archive storage 102. A more detailed description of storing archived data is described below in association with FIG. 7.

FIG. 7—Method for Storing Archived Data by EADO™

FIG. 7 is a flowchart of a method 700 for storing archived data by EADO™ 204 (FIGS. 2 and 6) in accordance with an embodiment of the present invention.

Referring to FIG. 7, in conjunction with FIGS. 1-2 and 5-6, in step 701, extractor 203 stores data segments read in operational database 101 that match a selection criteria in a temporary file as discussed above in connection with FIG. 5.

In step 702, extractor 203 spools the contents of the temporary file to writer services 601 of EADO™ 204 as discussed above in connection with FIG. 6.

In step 703, writer services 601 creates a new storage unit in archive storage 102 to archive the spooled contents of the temporary file. In one embodiment, the storage unit is an operating system file. It is noted that writer services 601 creates a new storage unit in archive storage 102 every time new data is stored in archive storage 102.

In step 704, writer services 601 stores the contents of the temporary file bit-for-bit in the created EADO™ storage unit. The contents that are stored in the created EADO™ storage unit contain data that is consistent with the meta-data that was current at the time of archiving. In one embodiment, writer services 601 may encrypt the stored contents if requested.

In step 705, writer services 601 transforms the stored data in the EADO™ storage unit to a common data type supported by EADO™ 204. The transformed data is stored in the created EADO™ storage unit for efficient access via a JDBC SQL request. Hence, writer services 601 stores the contents of the temporary file in its original form as well as in a transformed form in the created EADO™ storage unit. In one embodiment, the data is transformed both on the structural level as well as at the data type level. For example, transformations on the structural level may refer to changes in the physical layout of the data, such as changes in the layout of the data fields. Transformations at the data type level may refer to changes in the data type (e.g., integer value of one represented by "1" or the decimal value of "1.0") but it still retains the same value. The transformed data that is stored in the created EADO™ storage unit is consistent with the meta-data that was current at the time of archiving. In one embodiment, writer services 601 may encrypt the stored transformed data if requested.

In step 706, writer services 601 builds indexes in the created EADO™ storage unit for user specified selected columns of data stored in the created EADO™ storage unit.

In step 707, writer services 601 copies meta-data for the application plan from archive repository 202 to the created EADO™ storage unit. The meta-data that is stored in the created EADO™ storage unit applies to the data stored in that storage unit. This ensures that the data stored in the EADO™ storage unit has the same data structure as stored in the meta-data.

In step 708, writer services 601 computes scoping variables for selected columns of data and stores them in archive repository 202.

In step 709, writer services 601 computes hash values for the created EADO™ storage unit and stores the computed hash values in the created EADO™ storage unit as well as stores a copy of the computed hash values in archive repository 202. These computed hash values are used to detect unauthorized changes.

In step 710, writer services 601 creates one or more backup copies of the created EADO™ storage unit. In one embodiment, these backup copies are stored in separate storage locations, possibly geographically separate. In another embodiment, these backup copies are stored in EADO™ 204.

In step 711, writer services 601 further writes in the created EADO™ storage unit an identification of the sequence position of the created storage unit relative to the other storage units for an application plan. In this manner, the storage unit contains all of the information needed to identify what it is as well as how to read and present the data in a relational view.

It is noted that method 700 may include other and/or additional steps that, for clarity, are not depicted. It is further noted that method 700 may be executed in a different order presented and that the order presented in the discussion of FIG. 7 is illustrative. It is further noted that certain steps in method 700 may be executed in a substantially simultaneous manner or may be omitted.

Once the data is archived in archive storage 102, portions of the data in the form of "records" may be discarded if the records exist beyond a retention policy established by the user of client 104 as discussed below in association with FIG. 8.

FIG. 8—Method for Discarding Records in Archive Storage Unit Beyond Retention Period FIG. 8 is a flowchart of a method 800 for discarding records in archive storage 102 (FIGS. 1-2 and 6) that extend beyond the retention period established by the user of client 104 in accordance with an embodiment of the present invention.

Referring to FIG. 8, in conjunction with FIGS. 1-2 and 6, in step 801, discard services 605 reads the archive discard policy stored in archive repository 202. The archive discard policy indicates which records in the archive storage units are to be discarded.

In step 802, discard services 605 determines which EADO™ files within an EADO™ storage unit (EADO™ storage unit is made up of EADO™ files) to examine using the scoping variables (discussed above) in archive repository 202.

In step 803, discard services 605 determines whether there is an EADO™ file to examine. If there are no EADO™ files to examine, then method 800 is terminated at step 804.

If, however, there is an EADO™ file to examine, then, in step 805, discard services 605 compares the business objects in the EADO™ file with the business objects listed in the discard policy.

In step 806, discard services 605 determines if there are any matches between the business objects in the EADO™ file with the business objects listed in the discard policy. If there are no matches, then discard services 605 determines whether there is another EADO™ file to examine in step 803.

If, however, there is at least one match between the business objects in the EADO™ file with the business objects listed in the discard policy, then, in step 807, discard services 605 determines if all the business objects in the EADO™ file match the business objects listed in the discard policy.

If not all the business objects in the EADO™ file match the business objects listed in the discard policy, then, in step 808, writer services 601 writes a new EADO™ file for those business objects that do not match. In step 809, writer services 601 creates a backup of the newly created EADO™ file.

Upon writer services 601 creating a backup of the newly created EADO™ file or if all the business objects in the EADO™ file match the business objects listed in the discard policy, then, in step 810, discard services 605 records the primary keys (e.g., account numbers) of all the business objects that match the business objects listed in the discard policy.

In step 811, discard services 605 deletes the old EADO™ file (referring to the examined EADO™ file that contained one or more matched business objects) and corresponding backup copy(ies).

In step 812, discard services 605 updates archive repository 202 to reflect the deleted and newly created EADO™ files.

It is noted that method 800 may include other and/or additional steps that, for clarity, are not depicted. It is further noted that method 800 may be executed in a different order presented and that the order presented in the discussion of FIG. 8 is illustrative. It is further noted that certain steps in method 800 may be executed in a substantially simultaneous manner or may be omitted.

Further, once the data is archived (in a transformed state) in archive storage 102, as discussed above, the data may be accessed by a user of client 104 as discussed below in association with FIG. 9.

FIG. 9—Method for Accessing Data Archived in a Transformed State

FIG. 9 is a flowchart of a method 900 for accessing data in archive storage 102 (FIGS. 1-2 and 6) that was archived in a transformed state from operational database 101 (FIGS. 1-2) in accordance with an embodiment of the present invention.

Referring to FIG. 9, in conjunction with FIGS. 1-2 and 5-6, in step 901, reader services 603 receives an SQL statement from JDBC driver 602. The SQL statement, received from a user of client 104, is a request to access particular data.

In step 902, reader services 603 parses the received SQL statement.

In step 903, reader services 603 determines whether the columns used in the SQL statement ("predicate columns") for selecting records are also columns that are maintained in archive repository 202 as scoping variables. If the columns used in the SQL statement for selecting records do not have scoping variables in archive repository 202, then, in step 904, reader services 603 shows that all EADO™ storage units needed to be accessed for the plan.

If, however, the columns used in the SQL statement ("predicate columns") for selecting records are also columns that are maintained in archive repository 202 as scoping variables, then, in step 905, reader services 603 processes the selection logic (not shown) against the scoping variable values in archive repository 202 to determine which storage units need to be accessed.

Upon the execution of either step 904 or 905, reader services 603, in step 906, fetches the meta-data for all the storage units determined to be accessed.

In step 907, reader services determines whether there are any meta-data breaks between adjacent EADO™ storage units.

If there are meta-data breaks between adjacent EADO™ storage units, then, in step 908, reader services 603 determines whether these breaks interfere with the SQL statement. Meta-data breaks can exist between storage units within archive storage 102. However, if meta-data breaks are the result of differences in column definitions for columns not used in the SQL statement, then they will impact the execution result. The impact of the execution result may be referred to herein as "interference."

If these breaks do not interfere with the SQL statement, then, in step 909, reader services 603 sets the return code to a state of acceptance.

If, however, these breaks interfere with the SQL statement, then, in step 910, reader services 603 determines whether these meta-data breaks are unreconcilable. An unreconcilable break is one where the query processor cannot produce a meaningful result based on differences in the meta-data. For example, if a column is not included in a storage unit within archive storage 102 and that column is used in the SQL statement to select rows, then the SQL statement cannot run correctly. In this case, the SQL statement is rejected.

If these meta-data breaks are unreconcilable (e.g., major structural meta-data breaks), then, in step 911, reader services 603 rejects the SQL statement.

If, however, these meta-data breaks are not unreconcilable, then, in step 912, reader services 603 determines if the meta-data breaks are what is referred to herein as "partially reconcilable." Partially reconcilable breaks are those breaks where the process will produce values that may or may not be acceptable output for a column. For example, a column may be included in the data for one storage unit but not for another storage unit. When that occurs, the answer set will include a default value for the columns not included in that storage unit. This may or may not be acceptable to the user. Therefore, a warning return code is set to alert the user that the result may not be what they expect.

If these meta-data breaks are partially reconcilable, then, in step 913, reader services 603 sets the return code to a state of warning meaning that there may be potential problems in acquiring the appropriate requested data.

If, however, meta-data breaks are not partially reconcilable, then, in step 914, reader services 603 sets the return code to a state of acceptance as all the meta-data breaks are reconcilable. Fully reconcilable breaks (e.g., cosmetic or minor structural meta-data breaks) are differences in meta-data that can be fully processed to produce a consistent result without compromising the meaning of the data. For example, a column that increases length between storage units or a column that changes data type from integer to decimal are examples of reconcilable breaks.

Upon setting the return code to a state of acceptance or to a state of warning or if there are no meta-data breaks between adjacent EADO™ storage units, reader services 603 builds the consolidated meta-data in step 915. Consolidated meta-data refers to meta-data that includes all of the columns that will be used in the SQL processing and the data types and lengths that will be used to return results. The consolidated meta-data includes meta-data before and after the breaks.

Upon building the consolidated meta-data, reader services 603, in step 916, accesses the data requested by the user of client 104. In step 917, reader services 603 modifies the accessed data as necessary as indicated in the matched consolidated meta-data. In step 918, reader services 603 derives the SQL output format. In step 919, reader services 603 returns the requested data to the user.

It is noted that method 900 may include other and/or additional steps that, for clarity, are not depicted. It is further noted that method 900 may be executed in a different order presented and that the order presented in the discussion of FIG. 9 is illustrative. It is further noted that certain steps in method 900 may be executed in a substantially simultaneous manner or may be omitted.

In addition to method 900 for retrieving data from the storage units stored within archive storage 102 in a transformed state as discussed above, there is a method for retrieving data from the storage units stored within archive storage 102 in its original format as discussed below in association with FIG. 10.

FIG. 10—Method for Accessing Data Archived in its Original State

FIG. 10 is a flowchart of a method 1000 for accessing data in archive storage 102 (FIGS. 1-2 and 6) that was archived in its original state from operational database 101 (FIGS. 1-2) in accordance with an embodiment of the present invention.

Referring to FIG. 10, in conjunction with FIGS. 1-2 and 6, in step 1001, JDBC driver 602 receives an SQL statement from the user requesting retrieval of particular data stored in user-specified EADO™ storage units. To be clear, the SQL statement from the user may specify selected EADO™ storage units from which to retrieve data.

In step 1002, JDBC driver 602 forwards the request to reader services 603.

In step 1003, reader services 603 access the requested data in its original format in the requested EADO™ storage units.

In step 1004, reader services 603 sends the original data to recall services 604. In step 1005, recall services 604 writes the received data to a user designated output file.

It is noted that method 1000 may include other and/or additional steps that, for clarity, are not depicted. It is further noted that method 1000 may be executed in a different order presented and that the order presented in the discussion of FIG. 10 is illustrative. It is further noted that certain steps in method 1000 may be executed in a substantially simultaneous manner or may be omitted.

The components (archive application design 201, archive extractor 203, EADO™ 204) of archive system 103 described above in association with FIGS. 3-10 may be software components which operate on a computer system as described below in association with FIG. 11.

Figure 11:
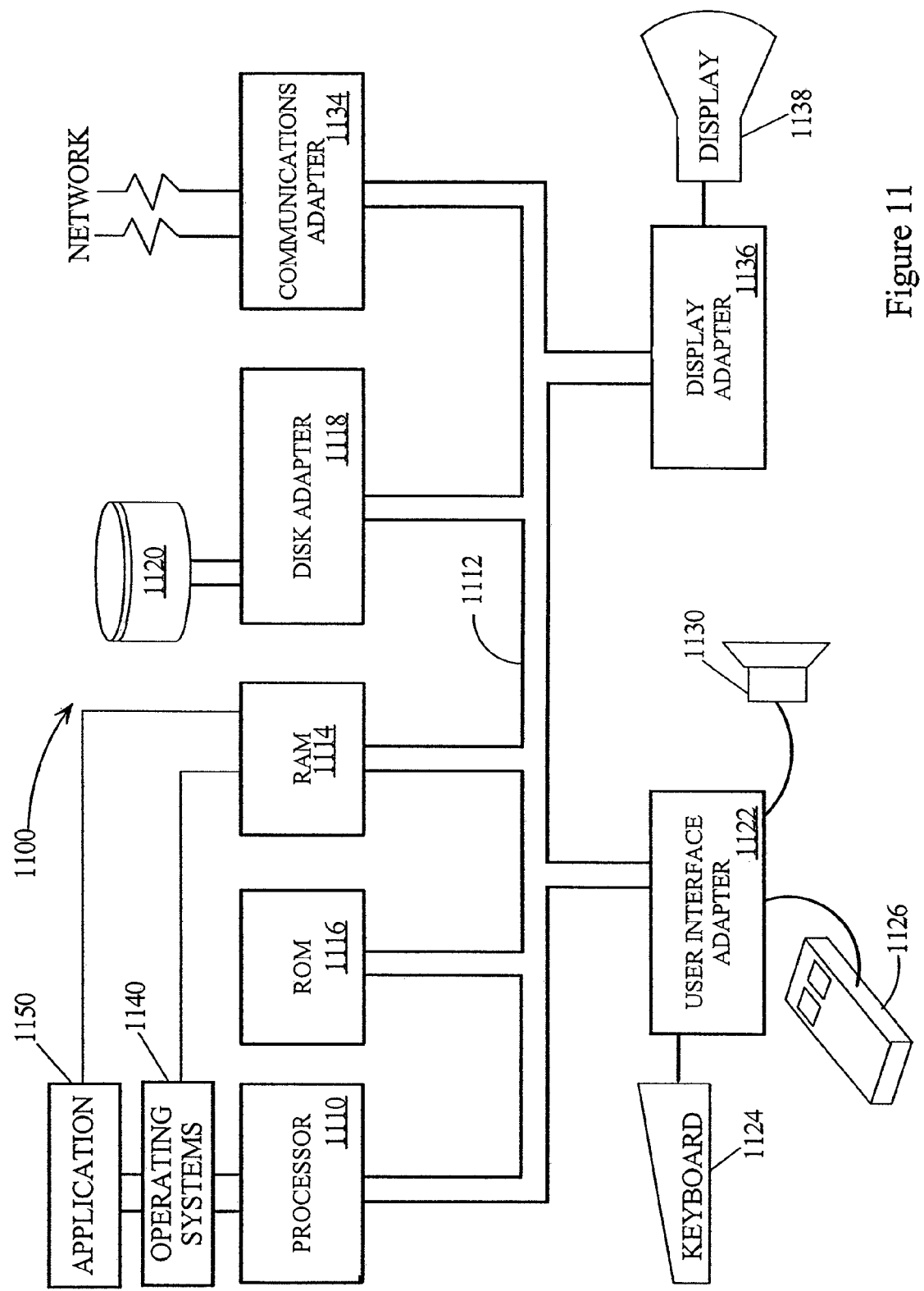
FIG. 11 is a hardware configuration of a computer system in accordance with an embodiment of the present invention.

FIG. 11—Computer System

FIG. 11 illustrates a typical hardware configuration of computer system 1100 which is representative of a hardware environment for practicing the present invention. Computer system 1100 may have a processor 1110 coupled to various other components by system bus 1112. An operating system 1140 may run on processor 1110 and provide control and coordinate the functions of the various components of FIG. 11. An application 1150 in accordance with the principles of the present invention may run in conjunction with operating system 1140 and provide calls to operating system 1140 where the calls implement the various functions or services to be performed by application 1150. Application 1150 may include, for example, the components (archive application design 201, archive extractor 203, EADO™ 204) of archive system 103 configured to perform the functions described above in association with FIGS. 3-10.

Read-Only Memory (ROM) 1116 may be coupled to system bus 1112 and include a basic input/output system ("BIOS") that controls certain basic functions of computer system 1100. Random access memory (RAM) 1114 and disk adapter 1118 may also be coupled to system bus 1112. It should be noted that software components including operating system 1140 and application 1150 may be loaded into RAM 1114, which may be the computer system's 1100 main memory, for execution. Disk adapter 1118 may be an integrated drive electronics ("IDE") adapter that communicates with a disk unit 1120, e.g., disk drive. It is noted that the components (archive application design 201, archive extractor 203, EADO™ 204) of archive system 103, configured to perform the functions described above in association with FIGS. 3-10, may reside in disk unit 1120 or in application 1150. It is further noted that disk unit 1120 may store the temporary and reload files mentioned above.

Referring to FIG. 11, computer system 1100 may further comprise a communications adapter 1134 coupled to bus 1112. Communications adapter 1134 may interconnect bus 1112 with an outside network, e.g., Local Area Network (LAN), Wide Area Network (WAN), enabling computer system 1100 to communicate with other such systems. I/O devices may also be connected to system bus 1112 via a user interface adapter 1122 and a display adapter 1136. Keyboard 1124, mouse 1126 and speaker 1130 may all be interconnected to bus 1112 through user interface adapter 1122. Data may be inputted to computer system 1100 through any of these devices. A display monitor 1138 may be connected to system bus 1112 by display adapter 1136. In this manner, a user is capable of inputting to computer system 1100 through keyboard 1124 or mouse 1126 and receiving output from computer system 1100 via display 1138 or speaker 1130.

Implementations of the invention include implementations as a computer system programmed to execute the method or methods described herein, and as a computer program product. According to the computer system implementations, sets of instructions for executing the method or methods may be resident in the random access memory 1114 of one or more computer systems configured generally as described above. Until required by computer system 1100, the set of instructions may be stored as a computer program product in another computer memory, for example, in disk unit 1120. Furthermore, the computer program product may also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Although the method, computer program product and system are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for archiving data from an operational database comprising the steps of:
    storing data segments from said operational database that match a selection criteria in a temporary file;
    providing contents of said temporary file to a component configured to write contents of said temporary file into an archive storage;
    creating a storage unit in said archive storage to archive said contents of said temporary file in said archive storage, wherein said archive storage has one or more storage units; and
    determining which storage unit within said archive storage is to be accessed in response to an access request using scoping variables stored in a repository.

2. The method as recited in claim 1 further comprising the step of:
    storing meta-data in said repository and a copy of said meta-data in said created storage unit.

3. The method as recited in claim 1 further comprising the steps of:
    transforming said archived contents of said temporary file to a common data type; and
    storing said transformed archived contents in said created storage unit.

4. The method as recited in claim 1 further comprising the step of:
    building an index in said created storage unit for selected columns of data stored in said created storage unit.

5. The method as recited in claim 1, wherein a storage unit is created in said archive storage every time new data is stored in said archive storage.

6. The method as recited in claim 1, wherein each storage unit in said archive storage is an operating system file.

7. The method as recited in claim 1, wherein each storage unit in said archive storage contains data that is consistent with meta-data that was current at time of archiving.

8. The method as recited in claim 1, wherein each storage unit in said archive storage contains an identification of a sequence position relative to other storage units in said archive storage.

9. The method as recited in claim 1, wherein each storage unit in said archive storage comprises meta-data that applies to data stored in that storage unit.

10. The method as recited in claim 1 further comprising the step of:
    computing hash values to detect unauthorized changes.

11. The method as recited in claim 10, wherein said hash values are stored in said created storage unit.

12. The method as recited in claim 10, wherein a copy of said hash values are stored in said repository.

13. The method as recited in claim 1 further comprising the step of:
    creating one or more backup copies of said created storage unit.

14. The method as recited in claim 1, wherein said archive storage is read-only.

15. The method as recited in claim 1 further comprising the step of:
    reading a discard policy stored in said repository.

16. The method as recited in claim 15 further comprising the step of:
    discarding all business objects that match business objects listed in said read discard policy that exist beyond a retention period.

17. The method as recited in claim 16, wherein said discarded business objects from said one or more storage units within said archive storage are overwritten with binary zeroes.

18. The method as recited in claim 16, wherein if all business objects in a storage unit within said archive storage become discarded, then said storage unit is marked as having no data.

19. The method as recited in claim 1, wherein an extractor is configured to spool contents of said temporary file to said component, wherein said extractor supports a function for simulating archiving without removing data from said operational database.

20. The method as recited in claim 1 further comprising the step of:
    storing said scoping variables for selected groupings of data in said repository.

21. The method as recited in claim 20, wherein said selected groupings of data are columns of data.

22. A computer program product embodied in a computer readable medium for archiving data from an operational database comprising the programming steps of:
    storing data segments read from said operational database that match a selection criteria in a temporary file;
    providing contents of said temporary file to a component configured to write contents of said temporary file into an archive storage;
    creating a storage unit in said archive storage to archive said contents of said temporary file in said archive storage, wherein said archive storage has one or more storage units; and
    determining which storage unit within said archive storage is to be accessed in response to an access request using scoping variables stored in a repository.

23. The computer program product as recited in claim 22 further comprising the programming step of:

storing meta-data in said repository and a copy of said meta-data in said created storage unit.

24. The computer program product as recited in claim 22 further comprising the programming steps of:
transforming said archived contents of said temporary file to a common data type; and
storing said transformed archived contents in said created storage unit.

25. The computer program product as recited in claim 22 further comprising the programming step of:
building an index in said created storage unit for selected columns of data stored in said created storage unit.

26. The computer program product as recited in claim 22, wherein a storage unit is created in said archive storage every time new data is stored in said archive storage.

27. The computer program product as recited in claim 22, wherein each storage unit in said archive storage is an operating system file.

28. The computer program product as recited in claim 22, wherein each storage unit in said archive storage contains data that is consistent with meta-data that was current at time of archiving.

29. The computer program product as recited in claim 22, wherein each storage unit in said archive storage contains an identification of a sequence position relative to other storage units in said archive storage.

30. The computer program product as recited in claim 22, wherein each storage unit in said archive storage comprises meta-data that applies to data stored in that storage unit.

31. The computer program product as recited in claim 22 further comprising the programming step of:
computing hash values to detect unauthorized changes.

32. The computer program product as recited in claim 31, wherein said hash values are stored in said created storage unit.

33. The computer program product as recited in claim 31, wherein a copy of said hash values are stored in said repository.

34. The computer program product as recited in claim 22 further comprising the programming step of:
creating one or more backup copies of said created storage unit.

35. The computer program product as recited in claim 22, wherein said archive storage is read-only.

36. The computer program product as recited in claim 22 further comprising the programming step of:
reading a discard policy stored in said repository.

37. The computer program product as recited in claim 36 further comprising the programming step of:
discarding all business objects that match business objects listed in said read discard policy that exist beyond a retention period.

38. The computer program product as recited in claim 37, wherein said discarded business objects from said one or more storage units within said archive storage are overwritten with binary zeroes.

39. The computer program product as recited in claim 37, wherein if all business objects in a storage unit within said archive storage become discarded, then said storage unit is marked as having no data.

40. The computer program product as recited in claim 22, wherein an extractor is configured to spool contents of said temporary file to said component, wherein said extractor supports a function for simulating archiving without removing data from said operational database.

41. The computer program product as recited in claim 22 further comprising the programming step of:
storing said scoping variables for selected groupings of data in said repository.

42. The computer program product as recited in claim 41, wherein said selected groupings of data are columns of data.

43. A system, comprising:
a memory unit for storing a computer program for archiving data from an operational database; and
a processor coupled to said memory unit, wherein said processor, responsive to said computer program, comprises:
circuitry for storing data segments from said operational database that match a selection criteria in a temporary file;
circuitry for providing contents of said temporary file to a component configured to write contents of said temporary file into an archive storage;
circuitry for creating a storage unit in said archive storage to archive said contents of said temporary file in said archive storage, wherein said archive storage has one or more storage units; and
determining which storage unit within said archive storage is to be accessed in response to an access request using scoping variables stored in a repository.

44. The system as recited in claim 43, wherein said processor further comprises:
circuitry for storing meta-data in said repository and a copy of said meta-data in said created storage unit.

45. The system as recited in claim 43, wherein said processor further comprises:
circuitry for transforming said archived contents of said temporary file to a common data type; and
circuitry for storing said transformed archived contents in said created storage unit.

46. The system as recited in claim 43, wherein said processor further comprises:
circuitry for building an index in said created storage unit for selected columns of data stored in said created storage unit.

47. The system as recited in claim 43, wherein a storage unit is created in said archive storage every time new data is stored in said archive storage.

48. The system as recited in claim 43, wherein each storage unit in said archive storage is an operating system file.

49. The system as recited in claim 43, wherein each storage unit in said archive storage contains data that is consistent with meta-data that was current at time of archiving.

50. The system as recited in claim 43, wherein each storage unit in said archive storage contains an identification of a sequence position relative to other storage units in said archive storage.

51. The system as recited in claim 43, wherein each storage unit in said archive storage comprises meta-data that applies to data stored in that storage unit.

52. The system as recited in claim 43, wherein said processor further comprises:
circuitry for computing hash values to detect unauthorized changes.

53. The system as recited in claim 52, wherein said hash values are stored in said created storage unit.

54. The system as recited in claim 52, wherein a copy of said hash values are stored in said repository.

55. The system as recited in claim 43, wherein said processor further comprises:
circuitry for creating one or more backup copies of said created storage unit.

56. The system as recited in claim 43, wherein said archive storage is read-only.

57. The system as recited in claim 43, wherein said processor further comprises:
  circuitry for reading a discard policy stored in said repository.

58. The system as recited in claim 57, wherein said processor further comprises:
  circuitry for discarding all business objects that match business objects listed in said read discard policy that exist beyond a retention period.

59. The system as recited in claim 58, wherein said discarded business objects from said one or more storage units within said archive storage are overwritten with binary zeroes.

60. The system as recited in claim 58, wherein if all business objects in a storage unit within said archive storage become discarded, then said storage unit is marked as having no data.

61. The system as recited in claim 43, wherein an extractor is configured to spool contents of said temporary file to said component, wherein said extractor supports a function for simulating archiving without removing data from said operational database.

62. The system as recited in claim 43, wherein said processor further comprises:
  circuitry for storing said scoping variables for selected groupings of data in said repository.

63. The system as recited in claim 62, wherein said selected groupings of data are columns of data.

* * * * *